(12) United States Patent
Baek et al.

(10) Patent No.: US 12,525,278 B2
(45) Date of Patent: Jan. 13, 2026

(54) MEMORY DEVICE PERFORMING TIMING SKEW AND OFFSET CALIBRATION

(71) Applicant: Samsung Electronics Co., Ltd., Suwon-si (KR)

(72) Inventors: Jaehyeok Baek, Suwon-si (KR); Sungyong Cho, Suwon-si (KR); Hyeran Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 129 days.

(21) Appl. No.: 18/600,736

(22) Filed: Mar. 10, 2024

(65) Prior Publication Data

US 2025/0014632 A1    Jan. 9, 2025

(30) Foreign Application Priority Data

Jul. 4, 2023    (KR) .................. 10-2023-0086319

(51) Int. Cl.
*G11C 11/4076* (2006.01)
*G11C 11/4093* (2006.01)
*G11C 11/4099* (2006.01)

(52) U.S. Cl.
CPC ...... *G11C 11/4076* (2013.01); *G11C 11/4093* (2013.01); *G11C 11/4099* (2013.01); *G11C 2207/2254* (2013.01)

(58) Field of Classification Search
CPC ............................................ G11C 11/4076
See application file for complete search history.

(56) References Cited

U.S. PATENT DOCUMENTS

| | | | |
|---|---|---|---|
| 7,593,285 B2 | 9/2009 | Cho | |
| 7,724,055 B2 | 5/2010 | Cheng | |
| 9,437,279 B2 | 9/2016 | Ware | |
| 10,255,964 B2 | 4/2019 | Shin et al. | |
| 10,460,793 B2 | 10/2019 | Shin et al. | |
| 10,699,770 B2 | 6/2020 | Shin et al. | |
| 10,867,657 B2 | 12/2020 | Shin et al. | |
| 11,087,822 B2 | 8/2021 | Shin et al. | |
| 11,621,034 B2 | 4/2023 | Shin et al. | |
| 2021/0141747 A1* | 5/2021 | Jeong | G11C 7/222 |
| 2023/0029968 A1 | 2/2023 | Chang et al. | |
| 2024/0113720 A1* | 4/2024 | Huang | H03M 1/1215 |

FOREIGN PATENT DOCUMENTS

| | | |
|---|---|---|
| KR | 10-0805698 B1 | 2/2008 |
| KR | 10-2272259 B1 | 7/2021 |
| KR | 10-2023-0019596 A | 2/2023 |

* cited by examiner

*Primary Examiner* — Hoai V Ho
(74) *Attorney, Agent, or Firm* — Muir Patent Law, PLLC

(57) ABSTRACT

A memory device includes a data input/output (I/O) pin, an output driver, a multi-level receiver and a calibrator. The output driver is connected to the data I/O pin, and generates an internal input signal based on a first clock signal. The multi-level receiver is connected to the data I/O pin, and includes a plurality of samplers. The plurality of samplers generate a plurality of decision signals by sampling the internal input signal based on a reference voltage and a second clock signal. The calibrator detects and compensates at least one of timing skew and offset associated with the plurality of samplers based on the plurality of decision signals. The internal input signal is a multi-level signal having three or more voltage levels that are different from each other.

20 Claims, 30 Drawing Sheets

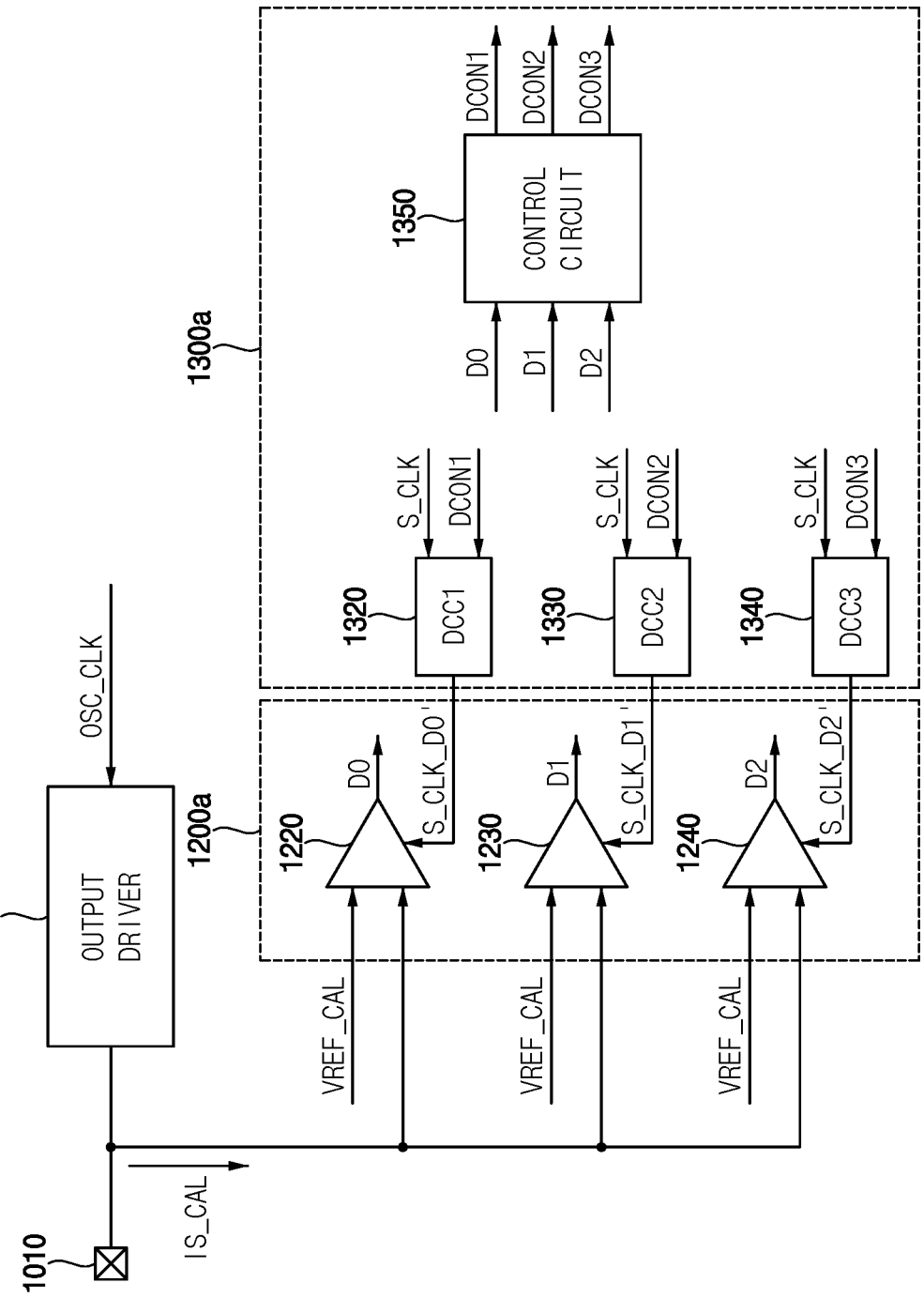

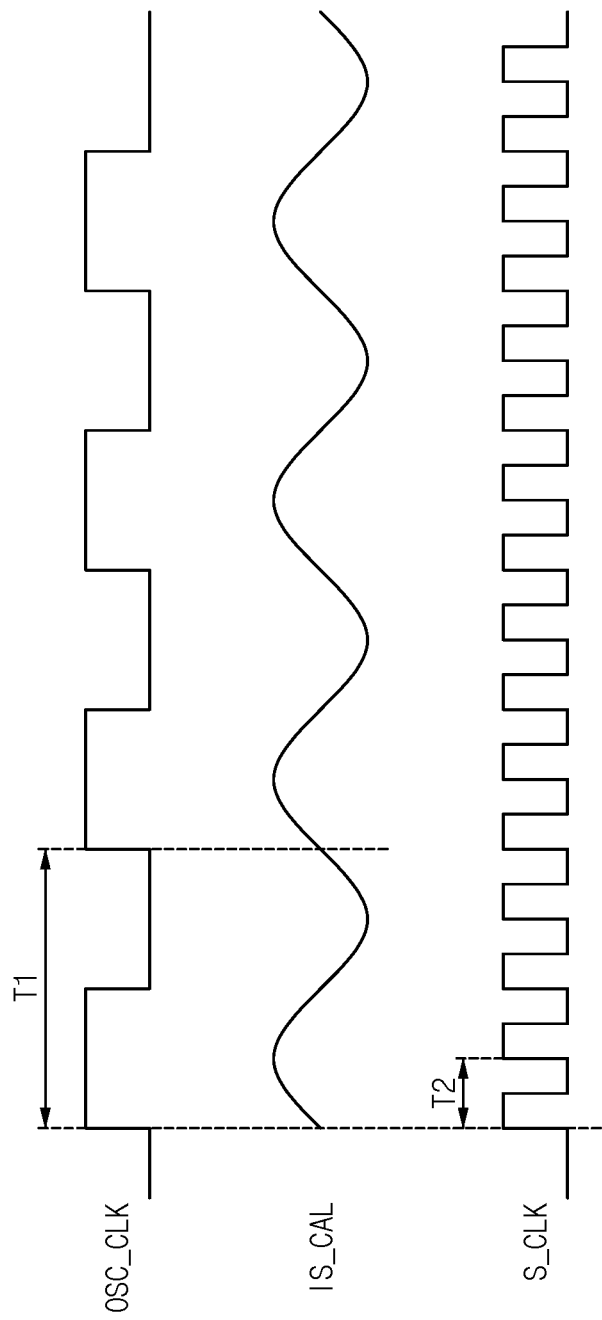

FIG. 8

| D0 | D1 | D2 | STATE |
|---|---|---|---|
| 0 | 0 | 0 | NO TIMING SKEW |
| 0 | 0 | 1 | S_CLK_D2 LEAD |
| 0 | 1 | 0 | S_CLK_D1 LEAD |
| 0 | 1 | 1 | S_CLK_D0 LAG |
| 1 | 0 | 0 | S_CLK_D0 LEAD |
| 1 | 0 | 1 | S_CLK_D1 LAG |
| 1 | 1 | 0 | S_CLK_D2 LAG |
| 1 | 1 | 1 | NO TIMING SKEW |

FIG. 12

|      | ts11 | ts12 | ts13 | ts14 | ts15 | ts16 | ts17 | ts18 |
|------|------|------|------|------|------|------|------|------|
| D0_0 | 1    | 1    | 1    | 1    | 0    | 0    | 0    | 0    |
| D0_1 | 1    | 1    | 1    | 1    | 0    | 0    | 0    | 0    |
| D0_2 | 1    | 1    | 1    | 0    | 0    | 0    | 0    | 0    |
| D0_3 | 1    | 1    | 1    | 1    | 0    | 0    | 0    | 0    |

MEMORY DEVICE PERFORMING TIMING SKEW AND OFFSET CALIBRATION

CROSS-REFERENCE TO RELATED APPLICATION(S)

This application claims priority under 35 USC § 119 to Korean Patent Application No. 10-2023-0086319 filed on Jul. 4, 2023 in the Korean Intellectual Property Office (KIPO), the disclosure of which is herein incorporated by reference in its entirety.

BACKGROUND

1. Technical Field

Example embodiments relate generally to semiconductor integrated circuits, and more particularly to memory devices performing timing skew and offset calibration.

2. Description of the Related Art

Semiconductor memory devices may be divided into two categories depending upon whether or not they retain stored data when disconnected from a power supply. These categories include volatile memory devices, which lose stored data when disconnected from power, and nonvolatile memory devices, which retain stored data when disconnected from power. While volatile memory devices may perform read and write operations at a high speed, contents stored therein may be lost at power-off. Since nonvolatile memory devices retain contents stored therein even at power-off, they may be used to store data that needs to be retained.

Recently, as the performance of semiconductor memory devices has improved, communication speed (or interface speed) between a memory controller and a semiconductor memory device has also increased. Thus, multi-level signaling in which a plurality of bits are transmitted during one unit interval (UI) has been researched.

SUMMARY

At least one example embodiment of the present disclosure provides a memory device capable of efficiently calibrating timing skew and offset internally without an external input while receiving a signal based on a multi-level signaling scheme.

At least one example embodiment of the present disclosure provides a memory device capable of efficiently calibrating timing skew and offset internally without an external input while receiving a signal based on a non-return-to-zero (NRZ) scheme.

According to example embodiments, a memory device includes a data input/output (I/O) pin, an output driver, a multi-level receiver and a calibrator. The output driver is connected to the data I/O pin, and generates an internal input signal based on a first clock signal. The multi-level receiver is connected to the data I/O pin, and includes a plurality of samplers. The plurality of samplers generate a plurality of decision signals by sampling the internal input signal based on a reference voltage and a second clock signal. The calibrator detects and compensates at least one of timing skew and offset associated with the plurality of samplers based on the plurality of decision signals. The internal input signal is a multi-level signal having three or more voltage levels that are different from each other.

According to example embodiments, a memory device includes a data input/output (I/O) pin, an output driver, a receiver and a calibrator. The output driver is connected to the data I/O pin, and generates an internal input signal based on a first clock signal. The receiver is connected to the data I/O pin, and includes a plurality of samplers. The plurality of samplers generate a plurality of decision signals by sampling the internal input signal based on a reference voltage and a plurality of second clock signals whose phases partially overlap. The calibrator detects and compensates an offset associated with the plurality of samplers based on the plurality of decision signals. The internal input signal is a non-return-to-zero (NRZ) signal having two voltage levels that are different from each other.

According to example embodiments, a memory device includes a data input/output (I/O) pin, an output driver, a multi-level receiver and a calibrator. The output driver is connected to the data I/O pin, and generates an internal input signal based on a first clock signal. The multi-level receiver is connected to the data I/O pin, and includes a plurality of samplers. The plurality of samplers generate a plurality of decision signals by sampling the internal input signal based on a reference voltage and a second clock signal. The calibrator detects and compensates at least one of timing skew and offset associated with the plurality of samplers based on the plurality of decision signals. The plurality of samplers include a first sampler, a second sampler, a third sampler, a fourth sampler, a fifth sampler and a sixth sampler. The first sampler generates a first decision signal by sampling the internal input signal based on the reference voltage and a first sub-clock signal. The second sampler generates a second decision signal by sampling the internal input signal based on the reference voltage and a second sub-clock signal. The third sampler generates a third decision signal by sampling the internal input signal based on the reference voltage and a third sub-clock signal. The fourth sampler generates a fourth decision signal by sampling the internal input signal based on the reference voltage and a fourth sub-clock signal. The fifth sampler generates a fifth decision signal by sampling the internal input signal based on the reference voltage and a fifth sub-clock signal. The sixth sampler generates a sixth decision signal by sampling the internal input signal based on the reference voltage and a sixth sub-clock signal. The first to sixth sub-clock signals are generated based on the second clock signal. Phases of the first to fourth sub-clock signals are partially overlapped with each other, and phases of the first, fifth, and sixth sub-clock signals are the same as each other. The calibrator includes a first offset control cell and a first delay control cell. The first offset control cell determines that an offset associated with the first sampler has occurred, and adjusts an output level of the first sampler, in response to a logic level of the first decision signal being different from a logic level of each of the second, third and fourth decision signals. The first delay control cell determines that a timing skew associated with the first sampler has occurred, and adjusts a phase of the first sub-clock, in response to a logic level of the first decision signal being different from a logic level of each of the fifth and sixth decision signals.

In the memory device according to example embodiments, a self-calibration operation may be performed using the internal input signal generated from the output driver. For example, the self-calibration operation may be internally performed without the external input signal. Accordingly, the timing skew and/or the offset associated with the plurality of samplers may be efficiently compensated, and the memory device may have relatively improved or enhanced DQ margin.

BRIEF DESCRIPTION OF THE DRAWINGS

Illustrative, non-limiting example embodiments will be more clearly understood from the following detailed description taken in conjunction with the accompanying drawings.

FIG. 5 is a block diagram illustrating an example of a memory device of FIG. 1 according to example embodiments.

FIGS. 6, 7A, 7B, 7C, 7D, 8, 9A and 9B are diagrams for describing an operation of a memory device of FIG. 5 according to example embodiments.

FIGS. 11, 12, 13A and 13B are diagrams for describing an operation of a memory device of FIGS. 10A and 10B according to example embodiments.

DETAILED DESCRIPTION OF THE EMBODIMENTS

Figure 1:
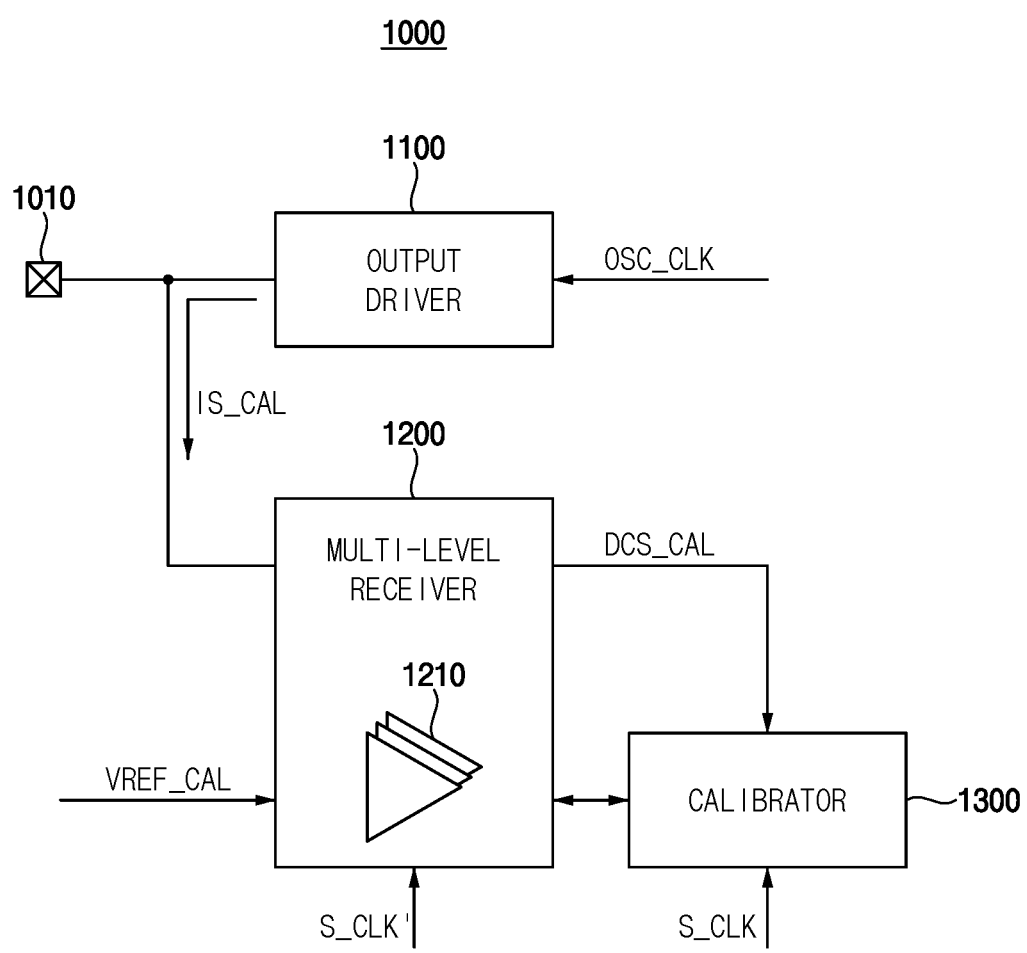
FIG. 1 is a block diagram illustrating a memory device according to example embodiments.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

FIG. 1 is a block diagram illustrating a memory device according to example embodiments.

Referring to FIG. 1, a memory device 1000 includes a data input/output (I/O) pin 1010, an output driver 1100, a multi-level receiver 1200 and a calibrator 1300.

In some example embodiments, the memory device 1000 may operate based on a multi-level signaling scheme. For example, in a normal operation mode, the output driver 1100 may generate a multi-level signal based on multi-bit data, and the multi-level receiver 1200 may generate a plurality of decision signals for generating multi-bit data based on a multi-level signal. For example, the multi-level signal may have one of three or more voltage levels that are different from each other during one unit interval (UI), and the multi-bit data may include two or more bits that are different from each other. Detailed operations of the memory device 1000 in the normal operation mode will be described with reference to FIGS. 3A and 3B.

In some example embodiments, the memory device 1000 may operate in a calibration mode (or compensation mode) different from the normal operation mode. For example, the memory device 1000 may include the calibrator 1300 for performing an operation in the calibration mode. For example, in the calibration mode, the calibrator 1300 may detect and compensate (or calibrate or correct) at least one of timing skew and offset associated with (or related to) the multi-level receiver 1200. FIG. 1 illustrates a detailed operation of the memory device 1000 in the calibration mode.

The output driver 1100 is connected to the data I/O pin 1010, and generates an internal input signal IS_CAL based on a first clock signal OSC_CLK. For example, although not illustrated in detail, the output driver 1100 may include at least one p-type metal oxide semiconductor (PMOS) transistor and at least one n-type metal oxide semiconductor (NMOS) transistor. The at least one PMOS transistor may be connected between a power supply voltage and an output node, and the at least one NMOS transistor may be connected between the output node and a ground voltage. For example, the output driver 1100 may be referred to as an off-chip driver (OCD).

The multi-level receiver 1200 is connected to the data I/O pin 1010, and includes a plurality of samplers 1210. The plurality of samplers 1210 generate a plurality of decision signals DCS_CAL by sampling the internal input signal IS_CAL based on a reference voltage VREF_CAL and a phase-adjusted (or delay-adjusted) second clock signal S_CLK' adjusted based on a second clock signal S_CLK that is different from the first clock signal OSC_CLK. Herein, a phase of the phase-adjusted second clock signal S_CLK' may be the same as a phase of the second clock signal S_CLK before the second clock signal is adjusted. For example, unlike in the normal operation mode, all of the plurality of samplers 1210 may operate using the same reference voltage (e.g., the reference voltage VREF_CAL) in the calibration mode.

Detailed configurations of the multi-level receiver 1200 will be described with reference to FIGS. 5, 10A and 10B.

In some example embodiments, when a calibration operation is performed in the calibration mode, both the output driver 1100 and the multi-level receiver 1200 may be enabled (or activated) and operate.

In some example embodiments, as will be described with reference to FIGS. 6, 7A, 7B, 7C and 7D, the internal input signal IS_CAL may have a variable level (e.g., a variable voltage level), and the reference voltage VREF_CAL may have a fixed level (e.g., a fixed voltage level). In other words, a sampling operation may be performed while fixing the level of the reference voltage VREF_CAL and changing the level of the internal input signal IS_CAL. In some example embodiments, as will be described with reference to FIG. 14, the internal input signal IS_CAL may have a fixed level, and the reference voltage VREF_CAL may have a variable level. In other words, a sampling operation may be performed while fixing the level of the internal input signal IS_CAL and changing the level of the reference voltage VREF_CAL.

The calibrator 1300 detects and compensates at least one of timing skew and offset associated with the plurality of samplers 1210 based on the plurality of decision signals DCS_CAL. As will be described with reference to FIGS. 9A and 9B, the timing skew may represent or indicate temporal errors (or differences) with respect to outputs of the plurality of samplers 1210 and/or temporal errors with respect to the phase-adjusted second clock signal S_CLK' provided to the plurality of samplers 1210. As will be described with reference to FIGS. 13A and 13B, the offset may represent or indicate errors (or differences) in output levels (e.g., voltage level) of the outputs of the plurality of samplers 1210.

Detailed configurations of the calibrator 1300 will be described with reference to FIGS. 2A, 2B, 5, 10A and 10B.

The data I/O pin 1010 is connected to the output driver 1100 and the multi-level receiver 1200. For example, a pin may be a contact pad or a contact pin, but example embodiments are not limited thereto.

In some example embodiments, in the calibration mode, the at least one of the timing skew and the offset associated with the plurality of samplers 1210 may be detected and compensated using only the internal input signal IS_CAL, without an external input signal received from an outside (e.g., from an external device) through the data I/O pin 1010. For example, in the calibration mode, the data I/O pin 1010 may have a high impedance (Hi-Z) state to prevent a reception of the external input signal.

The memory device 1000 according to example embodiments may perform a self-calibration operation using the internal input signal IS_CAL generated from the output driver 1100. For example, the self-calibration operation may be internally performed without the external input signal. Accordingly, the timing skew and/or the offset associated with the plurality of samplers 1210 may be efficiently compensated, and the memory device 1000 may have relatively improved or enhanced DQ margin.

Figure 2A:
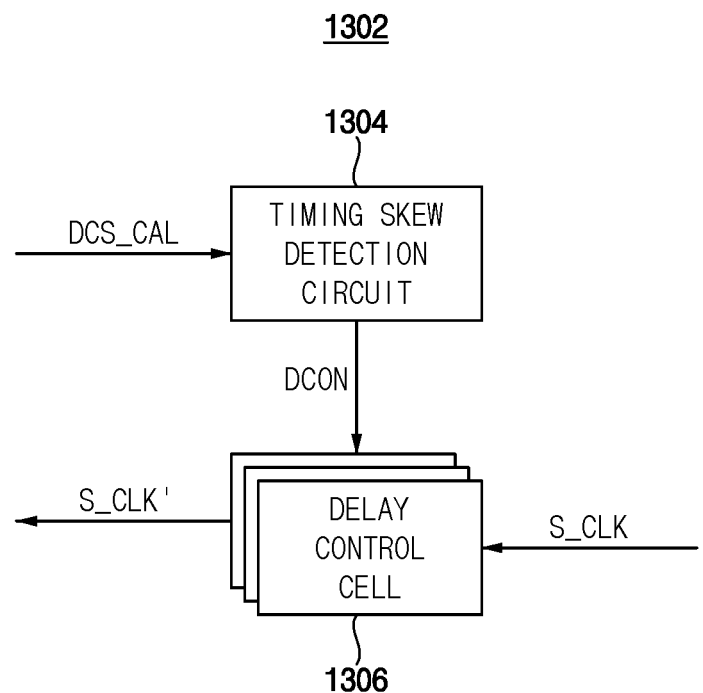
FIGS. 2A and 2B are block diagrams illustrating examples of a calibrator included in a memory device according to example embodiments.
Figure 2B:
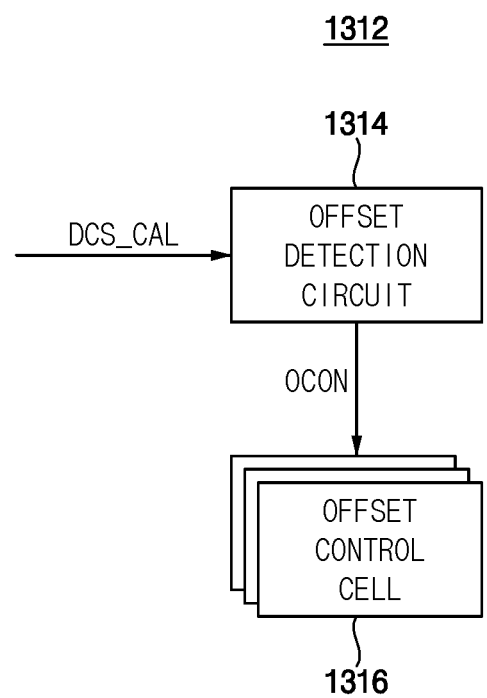

FIGS. 2A and 2B are block diagrams illustrating examples of a calibrator included in a memory device according to example embodiments.

Referring to FIG. 2A, a calibrator 1302 may include a timing skew detection circuit 1304 and a plurality of delay control cells 1306. FIG. 2A illustrates an example where the calibrator 1302 detects and compensates the timing skew associated with the plurality of samplers 1210.

The timing skew detection circuit 1304 may detect the timing skew associated with the plurality of samplers 1210 based on the plurality of decision signals DCS_CAL, and may generate a plurality of delay control signals DCON for controlling the plurality of delay control cells 1306.

The plurality of delay control cells 1306 may compensate the timing skew associated with the plurality of samplers 1210 by adjusting a phase of the second clock signal S_CLK based on the plurality of delay control signals DCON, and may generate the phase-adjusted (or delay-adjusted) second clock signal S_CLK'. For example, the number of the plurality of delay control cells 1306 may be substantially equal to the number of the plurality of samplers 1210. For example, the plurality of samplers 1210 may operate based on the phase-adjusted second clock signal S_CLK'.

Referring to FIG. 2B, a calibrator 1312 may include an offset detection circuit 1314 and a plurality of offset control cells 1316. FIG. 2B illustrates an example where the calibrator 1312 detects and compensates the offsets associated with the plurality of samplers 1210.

The offset detection circuit 1314 may detect the offset associated with the plurality of samplers 1210 based on the plurality of decision signals DCS_CAL, and may generate a plurality of offset control signals OCON for controlling the plurality of offset control cells 1316.

The plurality of offset control cells 1316 may compensate the offset associated with the plurality of samplers 1210 based on the plurality of offset control signals OCON. For example, the number of the plurality of offset control cells 1316 may be substantially equal to the number of the plurality of samplers 1210. For example, each of the plurality of offset control cells 1316 may be included in a respective one of the plurality of samplers 1210.

In some example embodiments, the calibrator may include all of the timing skew detection circuit 1304 and the plurality of delay control cells 1306 in FIG. 2A and the offset detection circuit 1314 and the plurality of offset control cells 1316 in FIG. 2B. In other words, the calibrator may detect and compensate both the timing skew and the offset associated with the plurality of samplers 1210.

Figure 3A:
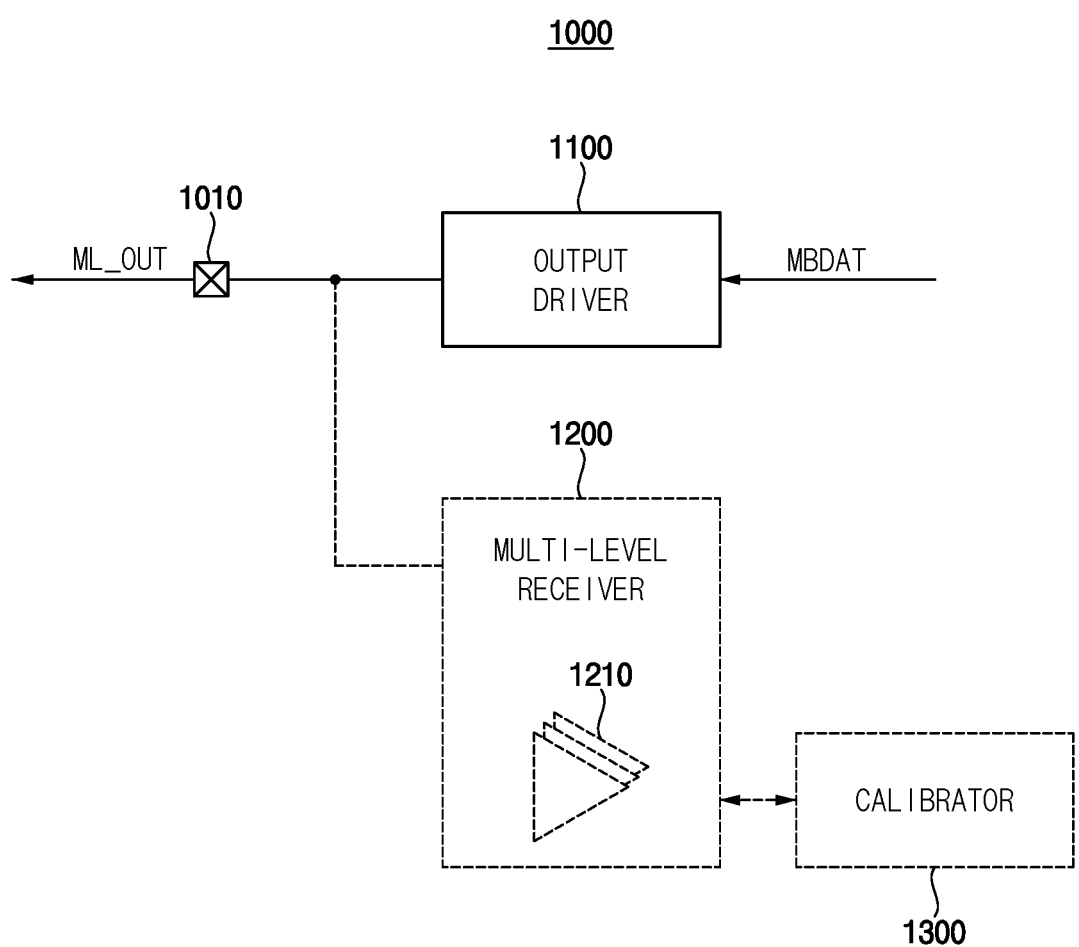
FIGS. 3A and 3B are block diagrams illustrating a memory device according to example embodiments.
Figure 3B:
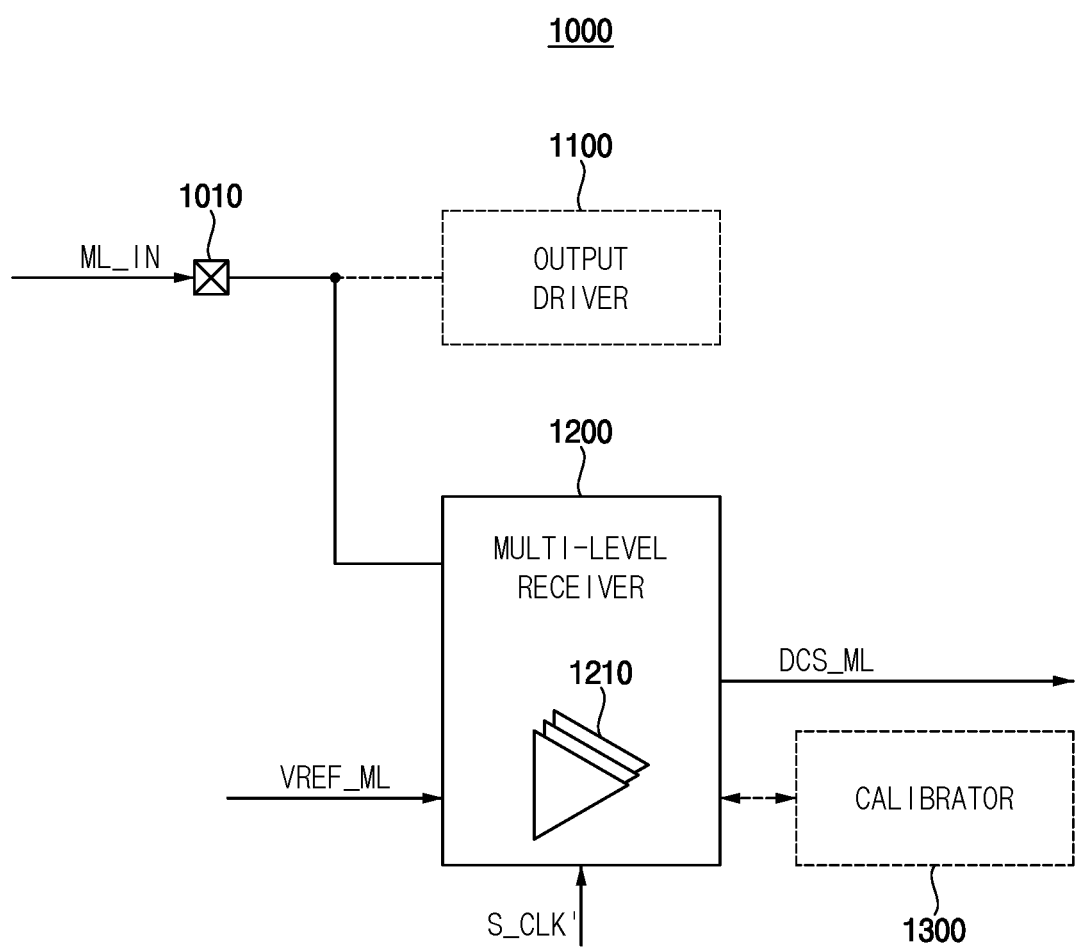

FIGS. 3A and 3B are block diagrams illustrating a memory device according to example embodiments. The descriptions repeated with FIG. 1 will be omitted.

Referring to FIGS. 3A and 3B, operations of the memory device 1000 in the normal operation mode are illustrated.

As illustrated in FIG. 3A, in the normal operation mode subsequent to the calibration mode, the memory device 1000 may perform a data output operation. For example, the output driver 1100 may generate a multi-level output signal ML_OUT based on multi-bit data MBDAT, and the multi-level output signal ML_OUT may be output through the data I/O pin 1010.

In some example embodiments, the data output operation may be at least a part of a data read operation of the memory device 1000. For example, when the data read operation is performed, the data output operation may be an operation of outputting the multi-bit data MBDAT read from a memory cell array (e.g., bank arrays 280a to 280d in FIG. 22) to an external device (e.g., a memory controller 20 in FIG. 20).

As illustrated in FIG. 3B, in the normal operation mode subsequent to the calibration mode, the memory device 1000 may perform a data reception operation. For example, a multi-level input signal ML_IN may be received through the data I/O pin 1010, and the plurality of samplers 1210 included in the multi-level receiver 1200 may generate a plurality of decision signals DCS_ML by sampling the multi-level input signal ML_IN based on a plurality of reference voltages VREF_ML and the phase-adjusted second clock signal S_CLK'. The plurality of reference voltages VREF_ML may be different from each other. For example, unlike in the calibration mode, at least some of the plurality of samplers 1210 may operate using different reference voltages (e.g., the plurality of reference voltages VREF_ML) in the normal operation mode.

In some example embodiments, the data reception operation may be at least a part of the data write operation of the memory device 1000. For example, when the data write operation is performed, the data reception operation may be an operation of receiving the multi-level input signal ML_IN corresponding to multi-bit data to be written into the memory cell array from the external device.

In some example embodiments, when the data output operation or the data reception operation is performed in the normal operation mode, one of the output driver 1100 and the multi-level receiver 1200 may be enabled (or activated) and operate. For example, when the data output operation is performed as illustrated in FIG. 3A, the output driver 1100 may be enabled and the multi-level receiver 1200 may be disabled (or deactivated). For example, when the data reception operation is performed as illustrated in FIG. 3B, the multi-level receiver 1200 may be enabled and the output driver 1100 may be disabled. In some example embodiments, when the data output operation or the data reception operation is performed in the normal operation mode, the calibrator 1300 may be disabled. In FIGS. 3A and 3B, disabled components are illustrated with dotted lines.

In some example embodiments, the operation mode of the memory device 1000 may be externally set (e.g., set based on an external control). For example, when a calibration mode entry command is received from the external device (e.g., the memory controller 20 in FIG. 20), the memory device 1000 may operate in the calibration mode, and may perform the calibration operation illustrated in FIG. 1. For example, when a write command or a read command is received from the external device, the memory device 1000 may perform the data write operation or the data read operation, and may perform the data output operation illustrated in FIG. 3A or the data reception operation illustrated in FIG. 3B.

In some example embodiments, the operation mode of the memory device 1000 may be internally set (e.g., set by itself). For example, at every predetermined cycle or when a predetermined operating environment is satisfied, the memory device 1000 may operate in the calibration mode, and may perform the calibration operation illustrated in FIG. 1.

The memory device 1000 according to example embodiments may operate based on a multi-level signaling scheme. The multi-level signaling scheme may be used as a means of compressing the bandwidth required to transmit data at a given bit rate. In a simple binary scheme, two single symbols, usually two voltage levels, may be used to represent '1' and '0', and thus the symbol rate may be equal to the bit rate. In contrast, the principle of the multi-level signaling scheme may use a larger alphabet of m symbols to represent data, so that each symbol may represent more than one bit of data. As a result, the number of symbols that needs to be transmitted may be less than the number of bits (e.g., the symbol rate may be less than the bit rate), and thus the bandwidth may be compressed. The alphabet of symbols may be constructed from a number of different voltage levels. For example, in a four-level scheme, groups of two data bits may be mapped to one of four symbols. Only one symbol need be transmitted for each pair of data bits, so the symbol rate may be a half of the bit rate.

In other words, the multi-level signaling scheme may be used to increase a data transmission (or transfer) rate without increasing the frequency of data transmission and/or a transmission power of the communicated data. An example of one type of the multi-level signaling scheme is a pulse amplitude modulation (PAM) scheme, where a unique symbol of a multi-level signal may represent a plurality of bits of data. The number of possible pulse amplitudes in a digital PAM scheme may be some power of two. For example, there may be $2^2$ possible discrete pulse amplitudes in a 4-level PAM (e.g., in PAM4), there may be $2^3$ possible discrete pulse amplitudes in an 8-level PAM (e.g., in PAM8), and there may be $2^4$ possible discrete pulse amplitudes in a 16-level PAM (e.g., in PAM16). However, example embodiments are not limited thereto, and example embodiments may be applied or employed to an X-level PAM (e.g., PAM(X)) having X possible pulse amplitudes, where X is a positive integer greater than or equal to three.

Figure 4A:
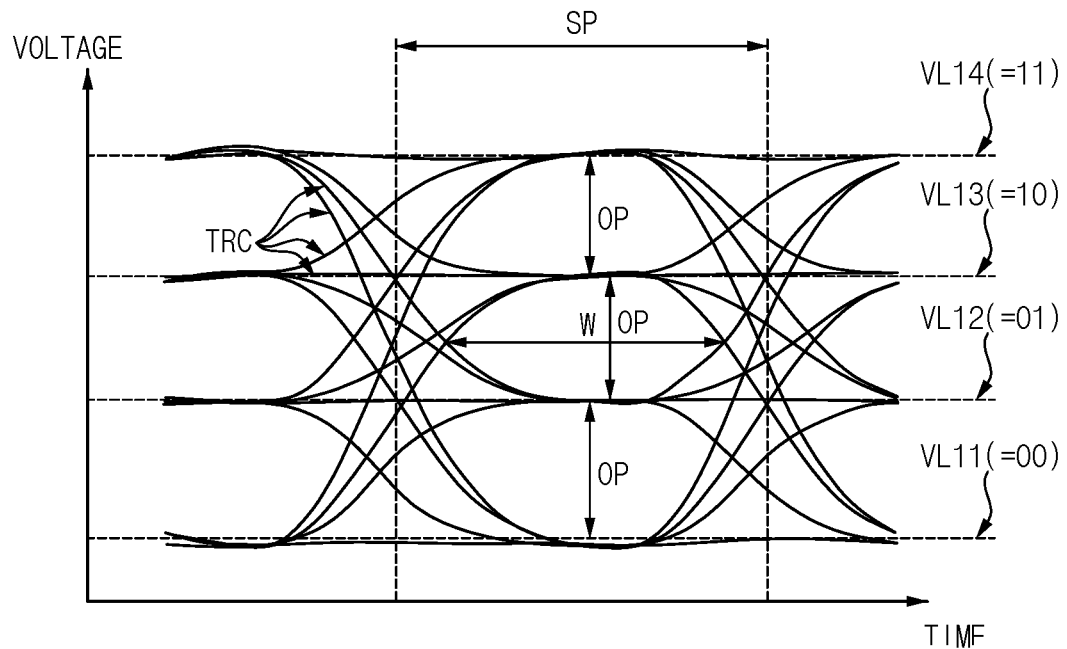
FIGS. 4A and 4B are diagrams for describing a multi-level signal that is input to or output from a memory device according to example embodiments.
Figure 4B:
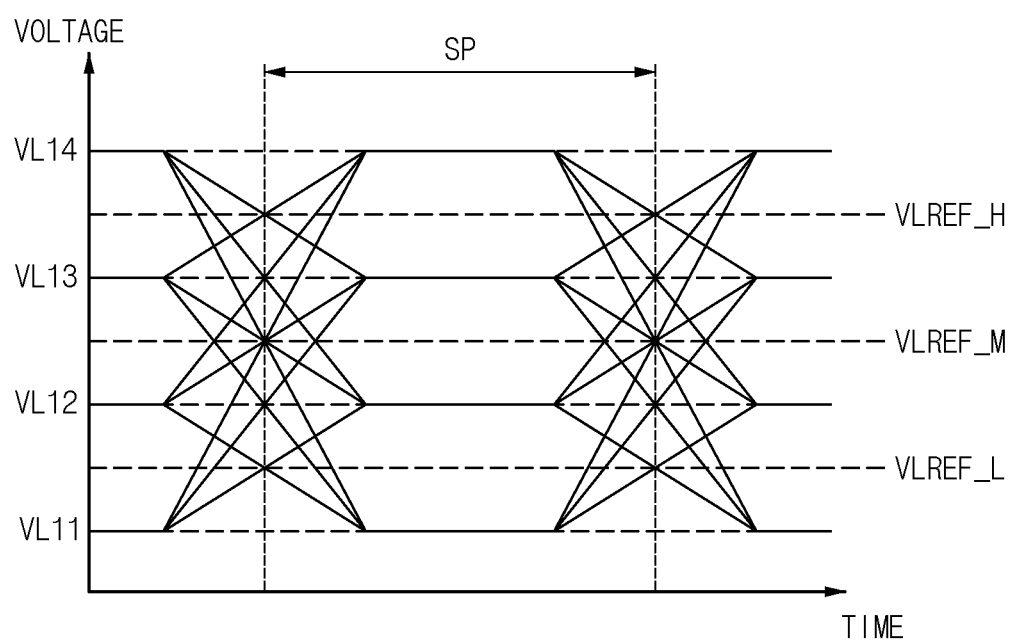

FIGS. 4A and 4B are diagrams for describing a multi-level signal that is input to or output from a memory device according to example embodiments.

FIG. 4A illustrates an ideal eye diagram of a data signal (e.g., a PAM4 signal) generated based on the 4-level scheme (e.g., the PAM4 scheme) that is an example of the multi-level signaling scheme (e.g., the PAM scheme). FIG. 4B is a diagram illustrated by simplifying the ideal eye diagram of FIG. 4A. For example, the PAM4 signal of FIGS. 4A and 4B may be an example of the multi-level output signal ML_OUT in FIG. 3A or the multi-level input signal ML_IN in FIG. 3B.

Referring to FIG. 4A, an eye diagram may be used to indicate the quality of signals in high-speed transmissions. For example, the eye diagram may represent four symbols of a signal (e.g., '00,' '01,' '10' and '11'), and each of the four symbols may be represented by a respective one of different voltage levels (e.g., voltage amplitudes) VL11, VL12, VL13 and VL14. The eye diagram may be used to provide a visual indication of the health of the signal integrity, and may indicate noise margins of the data signal.

To generate the eye diagram, an oscilloscope or other computing device may sample a digital signal according to a sample period SP (e.g., a unit interval or a bit period). The sample period SP may be defined by a clock signal associated with the transmission of the measured signal. The oscilloscope or other computing device may measure the voltage level of the signal during the sample period SP to form a plurality of traces TRC. Various characteristics associated with the measured signal may be determined by overlaying the plurality of traces TRC.

The eye diagram may be used to identify a number of characteristics of a communication signal such as jitter, cross talk, electromagnetic interference (EMI), signal loss, signal-to-noise ratio (SNR), other characteristics, or combinations thereof. For example, a width W of an eye in the eye diagram may be used to indicate a timing synchronization of the measured signal or jitter effects of the measured signal. For example, the eye diagram may indicate an eye opening OP, which represents a peak-to-peak voltage difference between the various voltage levels VL11, VL12, VL13 and VL14. The eye opening OP may be related to a voltage margin for discriminating between different voltage levels VL11, VL12, VL13 and VL14 of the measured signal.

Referring to FIG. 4B, different first, second, third and fourth voltage levels VL11, VL12, VL13 and VL14 of the data signal that is the PAM4 signal are illustrated, and different first, second and third reference levels VLREF_H, VLREF_M and VLREF_L for sensing or detecting the level of the data signal are illustrated. For example, the number of the reference levels may be less than the number of the voltage levels of the data signal by one.

The fourth voltage level VL14 that is the highest voltage level among the voltage levels VL11, VL12, VL13 and VL14 may be higher than the third voltage level VL13, the third voltage level VL13 may be higher than the second voltage level VL12, and the second voltage level VL12 may be higher than the first voltage level VL11 that is the lowest voltage level among the voltage levels VL11, VL12, VL13 and VL14. In addition, the first reference level VLREF_H may be a voltage level between the third and fourth voltage levels VL13 and VL14, the second reference level VLREF_M may be a voltage level between the second and third voltage levels VL12 and VL13, and the third reference level VLREF_L may be a voltage level between the first and second voltage levels VL11 and VL12. The voltage level (e.g., the symbol) of the data signal may be decided or determined based on a result of comparing the data signal with the reference levels VLREF_H, VLREF_M and VLREF_L.

For example, when the multi-level input signal ML_IN in FIG. 3B is the PAM4 signal, the plurality of reference voltages VREF_ML used by the plurality of samplers 1210 may include a first reference voltage having the first reference level VLREF_H, a second reference voltage having the second reference level VLREF_M and a third reference voltage having the third reference level VLREF_L.

Hereinafter, example embodiments will be described in detail based on the PAM4 scheme. However, example embodiments are not limited thereto, and example embodiments may be applied or employed to the PAM(K) scheme having K possible pulse amplitudes.

FIG. 5 is a block diagram illustrating an example of a memory device of FIG. 1 according to example embodiments.

Referring to FIG. 5, a memory device 1000a may include a data I/O pin 1010, an output driver 1100, a multi-level receiver 1200a and a calibrator 1300a.

The data I/O pin 1010 and the output driver 1100 may be substantially the same as those described with reference to FIG. 1, and the descriptions repeated with FIG. 1 will be omitted.

The multi-level receiver 1200a may include a first sampler 1220, a second sampler 1230 and a third sampler 1240.

The first sampler 1220 may generate a first decision signal D0 by sampling the internal input signal IS_CAL based on the reference voltage VREF_CAL and a phase-adjusted second clock signal S_CLK_D0'. The second sampler 1230 may generate a second decision signal D1 by sampling the internal input signal IS_CAL based on the reference voltage VREF_CAL and a phase-adjusted second clock signal S_CLK_D1'. The third sampler 1240 may generate a third decision signal D2 by sampling the internal input signal IS_CAL based on the reference voltage VREF_CAL and a phase-adjusted second clock signal S_CLK_D2'. As described above, in the calibration mode, all of the first, second and third samplers 1220, 1230 and 1240 may operate using the same reference voltage (e.g., the reference voltage VREF_CAL).

The calibrator 1300a may include a first delay control cell (DCC1) 1320, a second delay control cell (DCC2) 1330, a third delay control cell (DCC3) 1340 and a control circuit 1350.

The first delay control cell 1320 may generate the phase-adjusted second clock signal S_CLK_D0' provided to the first sampler 1220 by adjusting the phase of the second clock signal S_CLK based on the first delay control signal DCON1. The second delay control cell 1330 may generate the phase-adjusted second clock signal S_CLK_D1' provided to the second sampler 1230 by adjusting the phase of the second clock signal S_CLK based on the second delay control signal DCON2. The third delay control cell 1340 may generate the phase-adjusted second clock signal S_CLK_D2' provided to the third sampler 1240 by adjusting the phase of the second clock signal S_CLK based on the third delay control signal DCON3. The control circuit 1350 may generate the first, second and third delay control signals DCON1, DCON2 and DCON3 based on the first, second and third decision signals D0, D1 and D2. For example, each of the first, second and third delay control signals DCON1, DCON2 and DCON3 may have an initial value before a calibration operation is performed.

The calibrator 1300a may detect and compensate timing skew associated with the first, second and third samplers 1220, 1230 and 1240, and may correspond to the calibrator 1302 of FIG. 2A. For example, the control circuit 1350 may correspond to the timing skew detection circuit 1304 in FIG. 2A, and the first, second and third delay control cells 1320, 1330 and 1340 may correspond to the plurality of delay control cells 1306 in FIG. 2A.

Although not illustrated in detail, in the normal operation mode of FIG. 3B, the first sampler 1220 may sample the multi-level input signal ML_IN using the first reference voltage having the first reference level VLREF_H in FIG. 4B, the second sampler 1230 may sample the multi-level input signal ML_IN using the second reference voltage having the second reference level VLREF_M in FIG. 4B, the third sampler 1240 may sample the multi-level input signal ML_IN using the third reference voltage having the third reference level VLREF_L in FIG. 4B, and a voltage level of the multi-level input signal ML_IN may be determined and the multi-level data corresponding thereto may be generated based on the decision signals D0, D1, and D2 generated by results of the sampling operations. For example, when the voltage level of the multi-level input signal ML_IN is higher than all of the first, second and third reference levels VLREF_H, VLREF_M and VLREF_L, it may be determined that the multi-level input signal ML_IN has the voltage level VL14, and the multi-level data '11' corresponding to the voltage level VL14 may be generated.

FIGS. 6, 7A, 7B, 7C, 7D, 8, 9A and 9B are diagrams for describing an operation of a memory device of FIG. 5 according to example embodiments.

Referring to FIG. 6, example waveforms of the first clock signal OSC_CLK, the internal input signal IS_CAL and the second clock signal S_CLK are illustrated.

The internal input signal IS_CAL may be generated by driving (e.g., toggling) the output driver 1100 based on the first clock signal OSC_CLK. Therefore, a period T1 (or frequency) of the first clock signal OSC_CLK and a period (or frequency) of the internal input signal IS_CAL may be substantially equal to each other.

The internal input signal IS_CAL may be sampled based on the second clock signal S_CLK. In other words, the second clock signal S_CLK may be used as a sampling clock for the internal input signal IS_CAL. Therefore, a frequency of the second clock signal S_CLK may be higher than the frequency of the internal input signal IS_CAL (e.g., the frequency of the first clock signal OSC_CLK), and a period T2 of the second clock signal S_CLK may be shorter than the period of the internal input signal IS_CAL (e.g., the period T1 of the first clock signal OSC_CLK). For example, if the frequency of the internal input signal IS_CAL (e.g., the frequency of the first clock signal OSC_CLK) is defined by f, where f is a positive real number, the frequency of the second clock signal S_CLK may be higher than 2f.

Figure 7A:
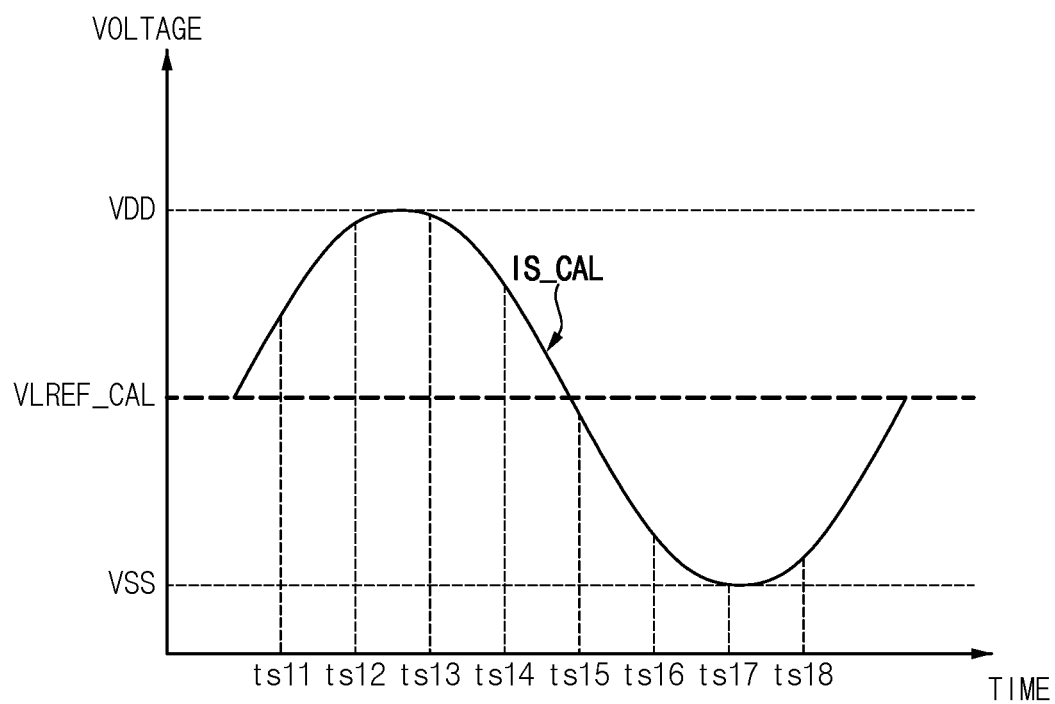

Referring to FIG. 7A, an example operation of sampling the internal input signal IS_CAL using the reference voltage VREF_CAL and the second clock signal S_CLK is illustrated.

The internal input signal IS_CAL may swing between a level of a power supply voltage VDD and a level of a ground voltage VSS, and the reference voltage VREF_CAL may have a reference level VLREF_CAL. For example, the level of the power supply voltage VDD and the level of the ground voltage VSS may correspond to the voltage level VL14 and voltage level VL11 in FIGS. 4A and 4B, respectively, and the reference level VLREF_CAL may correspond to the second reference level VLREF_M in FIG. 4B. For example, the reference level VLREF_CAL may be about VDD/2.

At each of sampling time points ts11, ts12, ts13, ts14, ts15, ts16, ts17 and ts18, the first, second and third samplers 1220, 1230 and 1240 may generate the first, second and third decision signals D0, D1 and D2, respectively, by comparing the level of the internal input signal IS_CAL with the reference level VLREF_CAL. For example, at sampling time points ts11, ts12, ts13 and ts14, the level of the internal input signal IS_CAL may be higher than the reference level VLREF_CAL, and thus the first sampler 1220 may generate the first decision signal D0 having a value of '1'. For example, at sampling time points ts15, ts16, ts17 and ts18, the level of the internal input signal IS_CAL may be lower than the reference level VLREF_CAL, and thus the first sampler 1220 may generate the first decision signal D0 having a value of '0'.

In some example embodiments, the above-described sampling operation may be performed based on rising edges or falling edges of the second clock signal S_CLK, and thus the sampling time points ts11, ts12, ts13, ts14, ts15, ts16, ts17 and ts18 may correspond to the rising edges or the falling edges of the second clock signal S_CLK. In some example embodiments, the above-described sampling operation may be performed based on both rising edges and falling edges of the second clock signal S_CLK, and thus the sampling time points ts11, ts12, ts13, ts14, ts15, ts16, ts17 and ts18 may correspond to both the rising edges and the falling edges of the second clock signal S_CLK.

Figure 7B:
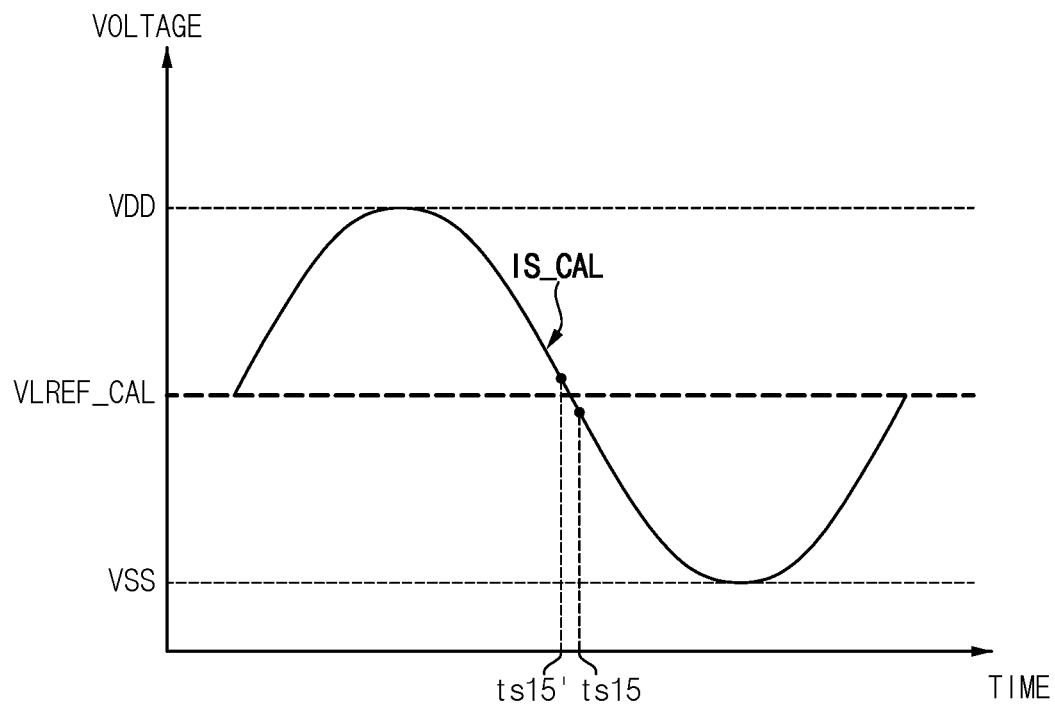

Referring to FIG. 7B, an example where timing skew occurs in the example of FIG. 7A is illustrated.

As described with reference to FIG. 7A, in a normal case where the timing skew does not occur, the level of the internal input signal IS_CAL may be lower than the reference level VLREF_CAL at the sampling time point ts15, and thus the first sampler 1220 may generate the first decision signal D0 having a value of '0'. On the other hand, when the timing skew occurs as illustrated in FIG. 7B. Before the calibration is performed, when a phase of the phase-adjusted second clock signal S_CLK_D0' provided to the first sampler 1220 leads, the sampling operation may be performed at a sampling time point ts15' prior to the sampling time point ts15. At the sampling time point ts15', the level of the internal input signal IS_CAL may be higher than the reference level VLREF_CAL, and thus the first sampler 1220 may generate the first decision signal D0 having a value of '1'. In this case, after the calibration is performed the calibrator 1300 or 1300a may generate the phase-adjusted second clock signal S_CLK_D0' and the sampling operation may be performed at the sampling time point ts15 such that the first sampler 1220 may generate the first decision signal D0 having a value of '0.'

Figure 7C:
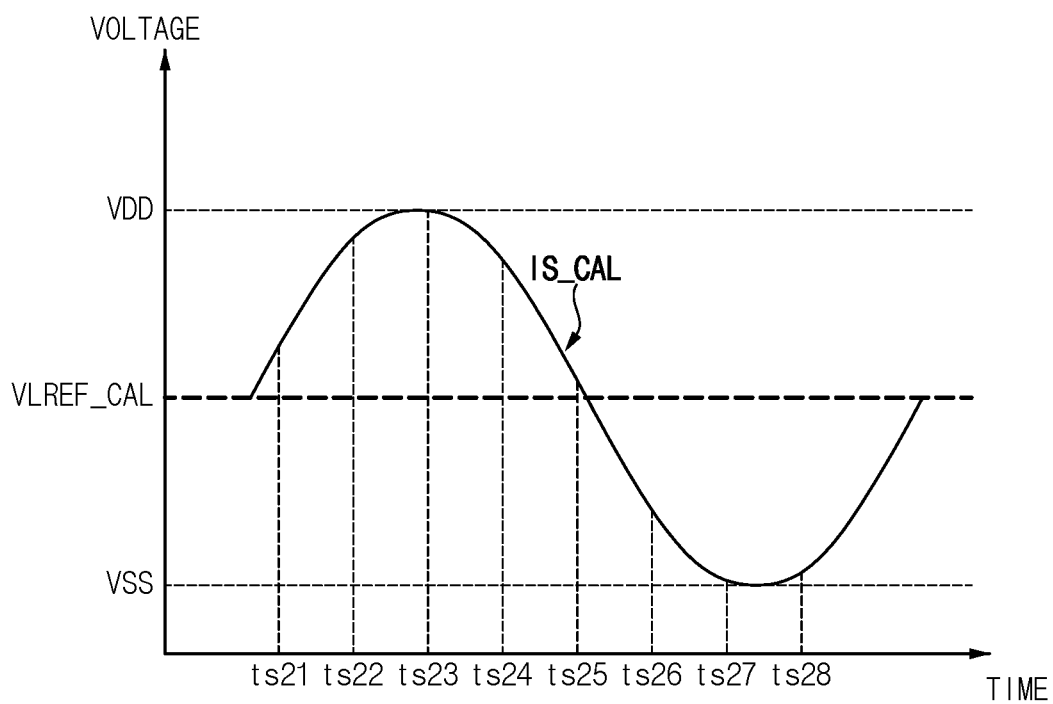

Referring to FIG. 7C, an example operation of sampling the internal input signal IS_CAL using the reference voltage VREF_CAL and the second clock signal S_CLK is illustrated. The descriptions repeated with FIG. 7A will be omitted.

At each of sampling time points ts21, ts22, ts23, ts24, ts25, ts26, ts27 and ts28, the first, second and third samplers 1220, 1230 and 1240 may generate the first, second and third decision signals D0, D1 and D2, respectively, by comparing the level of the internal input signal IS_CAL with the reference level VLREF_CAL. For example, at sampling time points ts21, ts22, ts23, ts24 and ts25, the level of the internal input signal IS_CAL may be higher than the reference level VLREF_CAL, and thus the first sampler 1220 may generate the first decision signal D0 having a value of '1'. For example, at sampling time points ts26, ts27 and ts28, the level of the internal input signal IS_CAL may be lower than the reference level VLREF_CAL, and thus the first sampler 1220 may generate the first decision signal D0 having a value of '0'.

Figure 7D:
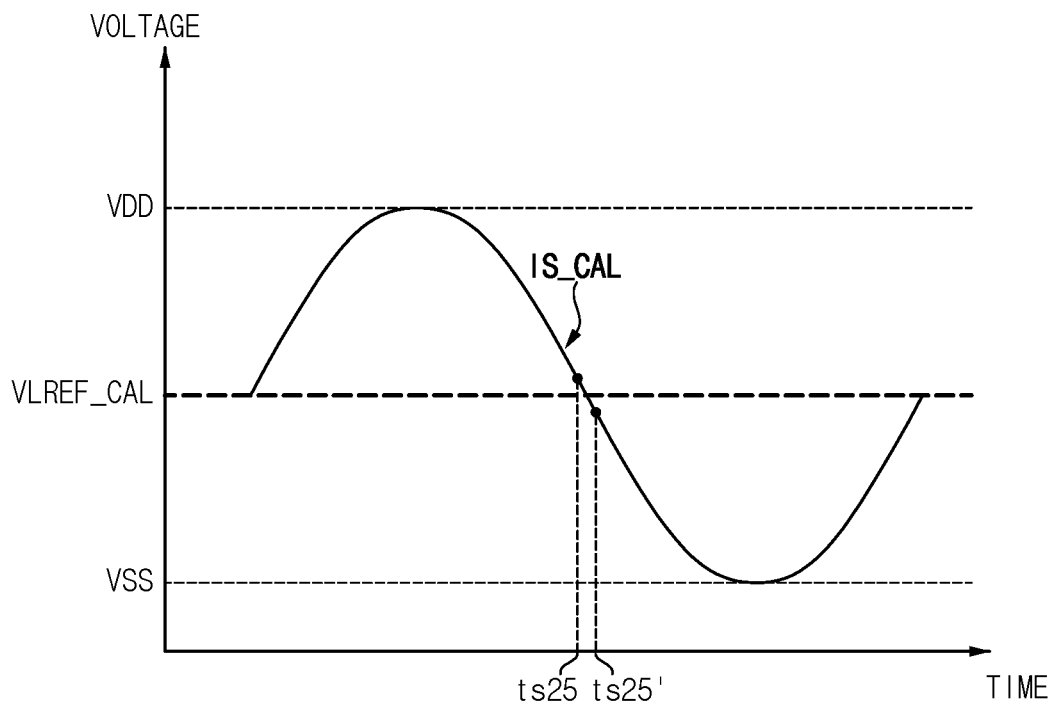

Referring to FIG. 7D, an example where timing skew occurs in the example of FIG. 7C is illustrated.

As described with reference to FIG. 7C, in a normal case where the timing skew does not occur, the level of the internal input signal IS_CAL may be higher than the reference level VLREF_CAL at the sampling time point ts25, and thus the first sampler 1220 may generate the first decision signal D0 having a value of '1'. On the other hand, when the timing skew occurs as illustrated in FIG. 7D. Before the calibration is performed, when a phase of the phase-adjusted second clock signal S_CLK_D0' provided to the first sampler 1220 lags, the sampling operation may be performed at a sampling time point ts25' later than the sampling time point ts25. At the sampling time point ts25', the level of the internal input signal IS_CAL may be lower than the reference level VLREF_CAL, and thus the first sampler 1220 may generate the first decision signal D0 having a value of '0'. In this case, after the calibration is performed the calibrator 1300 or 1300a may generate the phase-adjusted second clock signal S_CLK_D0' and the sampling operation may be performed at the sampling time point ts25 such that the first sampler 1220 may generate the first decision signal D0 having a value of '1.'

Accordingly, it may be determined whether the timing skew has occurred by performing the sampling operation using the first, second and third samplers 1220, 1230 and 1240 based on the same internal input signal IS_CAL and the same reference voltage VREF_CAL. For example, when a value of one of the first, second and third decision signals D0, D1 and D2 generated from the first, second and third samplers 1220, 1230 and 1240 is different from values of the remaining decision signals, it may be determined that the timing skew illustrated in FIG. 7B or FIG. 7D has occurred.

Referring to FIG. 8, an example of values (e.g., logic levels) of the first, second and third decision signals D0, D1, and D2 generated as a result of the sampling operation in the calibration mode is illustrated.

When only the third decision signal D2 has the value of '1' and the first and second decision signals D0 and D1 have the value of '0' among the first, second and third decision signals D0, D1 and D2, it may be determined that the timing skew illustrated in FIG. 7B has occurred on the third sampler 1240, e.g., the phase of the phase-adjusted second clock signal S_CLK_D2' provided to the third sampler 1240 leads. Thus, the phase of the phase-adjusted second clock signal S_CLK_D2' provided to the third sampler 1240 may be adjusted (e.g., delayed) using the third delay control signal DCON3 and the third delay control cell 1340. As a result, the phase of the phase-adjusted second clock signal S_CLK_D2' provided to the third sampler 1240 may be matched (or coincide) with the phase-adjusted second clock signals S_CLK_D0' and S_CLK_D1' provided to the first and second samplers 1220 and 1230, and the timing skew may be compensated or calibrated.

Similarly, when only the second decision signal D1 has the value of '1' and the first and third decision signals D0 and D2 have the value of '0', it may be determined that the timing skew illustrated in FIG. 7B has occurred on the second sampler 1230, e.g., the phase of the phase-adjusted second clock signal S_CLK_D1' provided to the second sampler 1230 leads, and thus the phase of the phase-adjusted second clock signal S_CLK_D1' provided to the second sampler 1230 may be adjusted using the second delay control signal DCON2 and the second delay control cell 1330. When only the first decision signal D0 has the value of '1' and the second and third decision signals D1 and D2 have the value of '0', it may be determined that the timing skew illustrated in FIG. 7B has occurred on the first sampler 1220, e.g., the phase-adjusted second clock signal S_CLK_D0' provided to the first sampler 1220 leads, and thus the phase-adjusted second clock signal S_CLK_D0' provided to the first sampler 1220 may be adjusted using the first delay control signal DCON1 and the first delay control cell 1320.

When only the first decision signal D0 has the value of '0' and the second and third decision signals D1 and D2 have the value of '1' among the first, second and third decision signals D0, D1 and D2, it may be determined that the timing skew illustrated in FIG. 7D has occurred on the first sampler 1220, e.g., the phase-adjusted second clock signal S_CLK_D0' provided to the first sampler 1220 lags. Thus, the phase-adjusted second clock signal S_CLK_D0' provided to the first sampler 1220 may be adjusted (e.g., pulled forward) using the first delay control signal DCON1 and the first delay control cell 1320. As a result, the phase-adjusted second clock signal S_CLK_D0 provided to the first sampler 1220 may be matched with the phase-adjusted second clock signals S_CLK_D1' and S_CLK_D2' provided to the second and third samplers 1230 and 1240, and the timing skew may be compensated.

Similarly, when only the second decision signal D1 has the value of '0' and the first and third decision signals D0 and D2 have the value of '1', it may be determined that the timing skew illustrated in FIG. 7D has occurred on the second sampler 1230, e.g., the phase of the phase-adjusted second clock signal S_CLK_D1' provided to the second sampler 1230 lags, and thus the phase of the phase-adjusted second clock signal S_CLK_D1' provided to the second sampler 1230 may be adjusted using the second delay control signal DCON2 and the second delay control cell 1330. When only the third decision signal D2 has the value of '0' and the first and second decision signals D0 and D1 have the value of '1', it may be determined that the timing skew illustrated in FIG. 7D has occurred on the third sampler 1240, e.g., the phase of the phase-adjusted second clock signal S_CLK_D2' provided to the third sampler 1240 lags, and thus the phase of the phase-adjusted second clock signal S_CLK_D2' provided to the third sampler 1240 may be adjusted using the third delay control signal DCON3 and the third delay control cell 1340.

In other words, the clock skew direction may be detected, determined and compensated by driving the first, second and third samplers 1220, 1230 and 1240.

When all of the first, second and third decision signals D0, D1 and D2 have the value of '1', or when all of the first, second and third decision signals D0, D1 and D2 have the value of '0', it may be determined that there is no timing skew on the first, second and third samplers 1220, 1230 and 1240, for example, the phase-adjusted second clock signals S_CLK_D0', S_CLK_D1' and S_CLK_D2' provided to the first, second and third samplers 1220, 1230 and 1240 are matched or identical. In this case, the calibration operation may not be performed.

Although example embodiments are described based on the example where the phase of the clock signal corresponding to the decision signal having the different value is adjusted when the value of one of the first, second and third decision signals D0, D1 and D2 is different from the values of the remaining decision signals, example embodiments are not limited thereto. For example, one of the first, second and third decision signals D0, D1 and D2 may be set as a reference value, and phases of clock signals corresponding to decision signals other than the reference value of the one of the first, second and third decision signals D0, D1 and D2 may be adjusted. For example, when the first decision signal D0 is set as a reference value, and when the value of at least one of the second and third decision signals D1 and D2 is different from the value of the first decision signal D0, at least one of the phase-adjusted second clock signals S_CLK_D1' and S_CLK_D2' may be adjusted. For example, when the first decision signal D0 has the value of '0' and the second and third decision signals D1 and D2 have the value of '1', or when the first decision signal D0 has the value of '1' and the second and third decision signals D1 and D2 have the value of '0', the phase-adjusted second clock signals S_CLK_D1' and S_CLK_D2' may be adjusted rather than adjusting the phase of the phase-adjusted second clock signal S_CLK_D0', and thus the timing skew may be compensated.

Figure 9A:
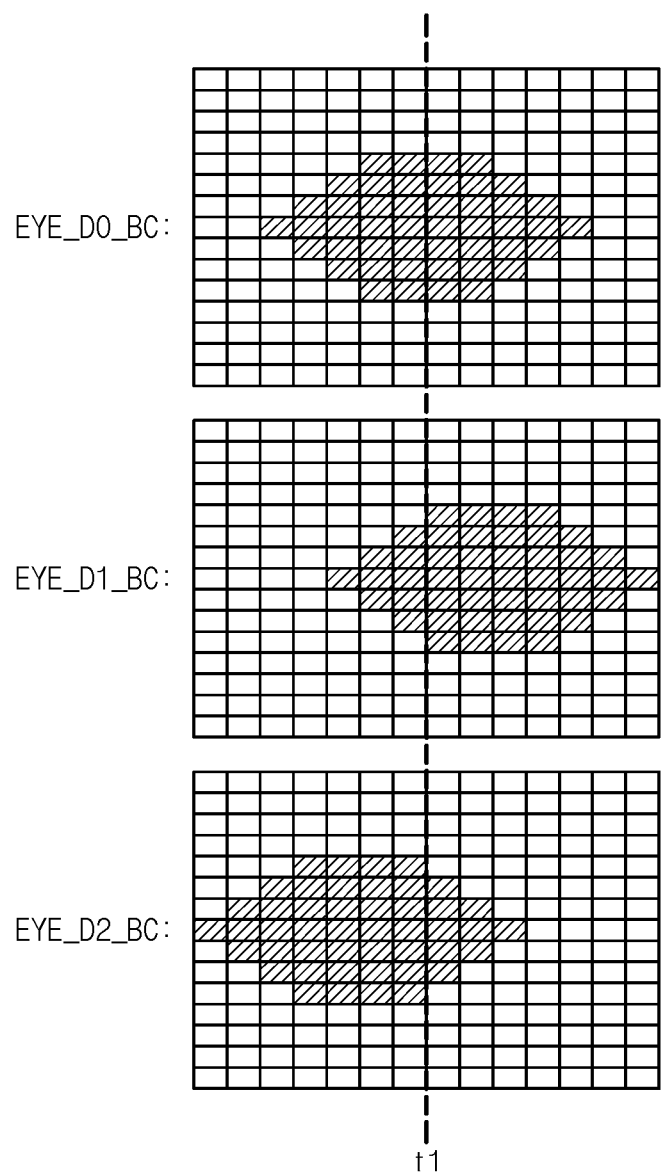
Figure 9B:
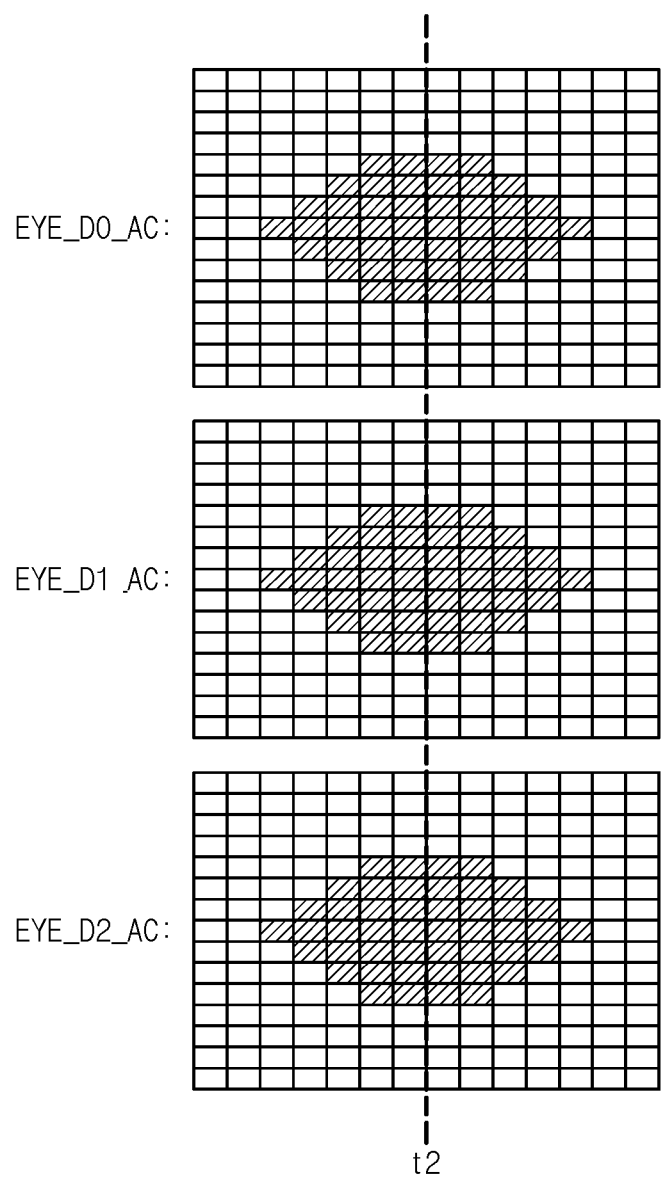

Referring to FIGS. 9A and 9B, examples of outputs of the first, second and third samplers 1220, 1230 and 1240 are illustrated. For example, eye diagrams or valid windows of the first, second and third decision signals D0, D1 and D2 are illustrated in FIGS. 9A and 9B. Among a plurality of rectangular blocks in FIGS. 9A and 9B, a hatched rectangular block represents a valid region or a pass region in which data is determined to be valid, and an empty rectangular block represents an invalid region or a fail region in which data is determined to be invalid.

As illustrated in FIG. 9A, before the calibration operation is performed, eye diagrams EYE_D0_BC, EYE_D1_BC, and EYE_D2_BC of the first, second and third decision signals D0, D1 and D2 may not be aligned with respect to a sampling time point t1, and timing skew, timing mismatch (or inconsistency) and/or timing error may exist.

As illustrated in FIG. 9B, after the calibration operation is performed, eye diagrams EYE_D0_AC, EYE_D1_AC and EYE_D2_AC of the first, second and third decision signals D0, D1 and D2 may be aligned with respect to a sampling time point t2, and the timing skew may be removed or eliminated, and the DQ margin may be improved or enhanced.

Figure 10A:
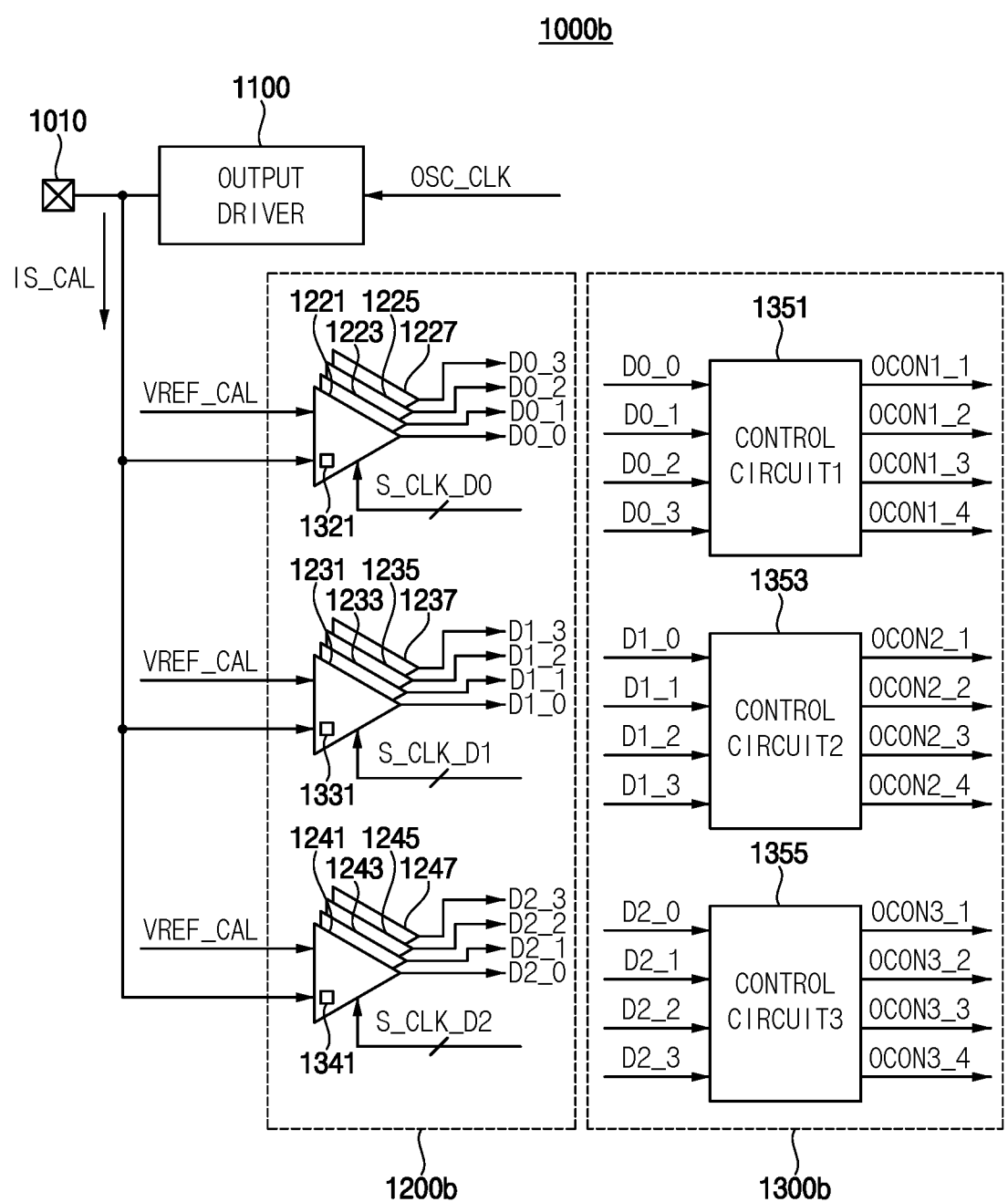
FIGS. 10A and 10B are block diagrams illustrating an example of a memory device of FIG. 1 according to example embodiments.
Figure 10B:
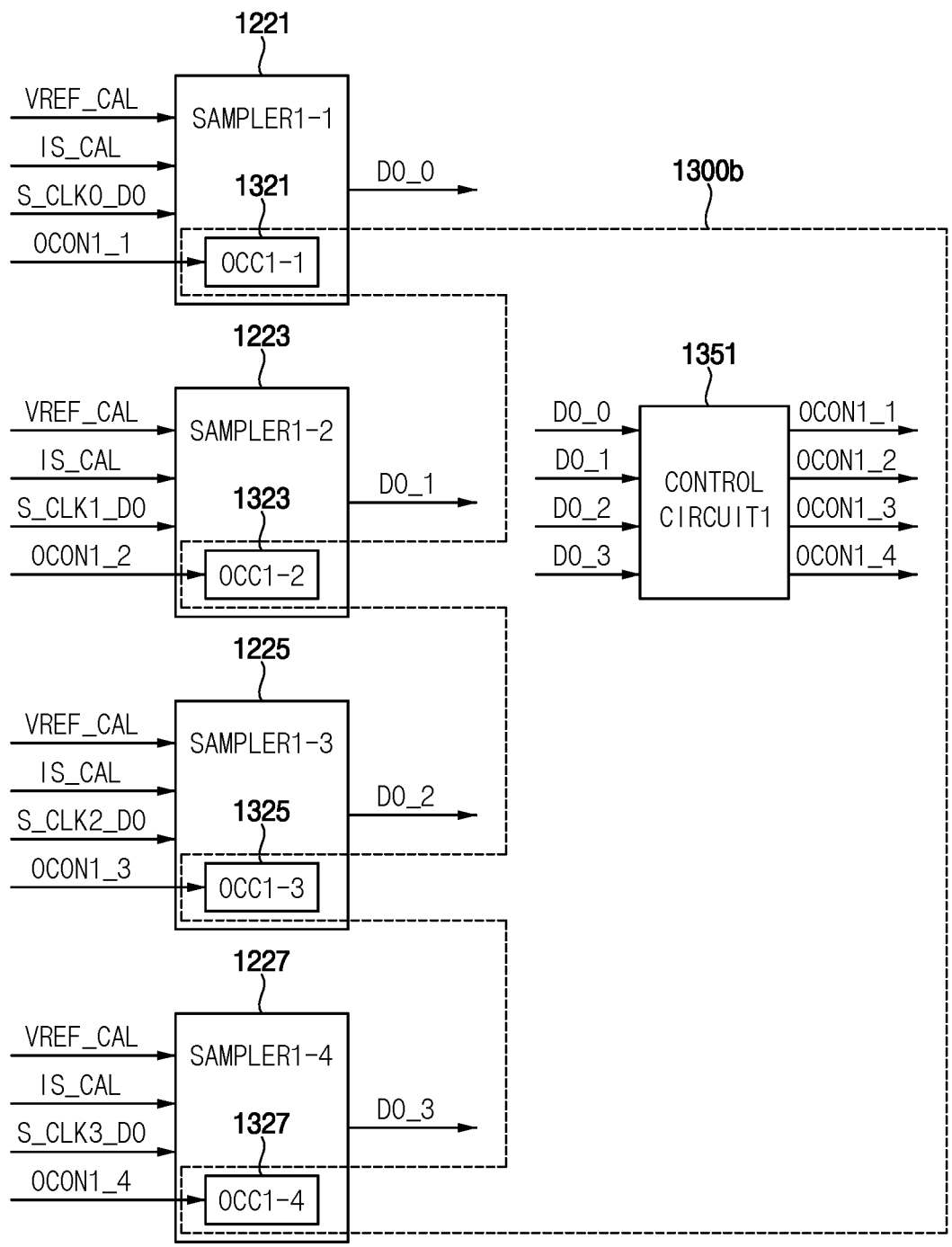

FIGS. 10A and 10B are block diagrams illustrating an example of a memory device of FIG. 1 according to example embodiments.

Referring to FIGS. 10A and 10B, a memory device 1000b includes a data I/O pin 1010, an output driver 1100, a multi-level receiver 1200b and a calibrator 1300b.

The data I/O pin 1010 and the output driver 1100 may be substantially the same as those described with reference to FIG. 1, and the descriptions repeated with FIG. 1 will be omitted.

The multi-level receiver 1200b may include a first sampler 1221, a second sampler 1223, a third sampler 1225 and a fourth sampler 1227.

The first, second, third and fourth samplers 1221, 1223, 1225 and 1227 may operate based on a sampler clock signal S_CLK_D0. The sampler clock signal S_CLK_D0 may be generated from the second clock signal S_CLK and include a first sub-clock signal S_CLK0_D0, a second sub-clock signal S_CLK1_D0, a third sub-clock signal S_CLK2_D0 and a fourth sub-clock signal S_CLK3_D0 whose phases partially overlap. In some embodiments, phases of the first to fourth sub-clock signals S_CLK0_D0 to S_CLK3_D0 may be the same as each other. The first, second, third and fourth samplers 1221, 1223, 1225 and 1227 may correspond to the first sampler 1220 in FIG. 5.

The first sampler 1221 may generate a first decision signal D0_0 by sampling the internal input signal IS_CAL based on the reference voltage VREF_CAL and the first sub-clock signal S_CLK0_D0. The second sampler 1223 may generate a second decision signal D0_1 by sampling the internal input signal IS_CAL based on the reference voltage VREF_CAL and the second sub-clock signal S_CLK1_D0. The third sampler 1225 may generate a third decision signal D0_2 by sampling the internal input signal IS_CAL based on the reference voltage VREF_CAL and the third sub-clock signal S_CLK2_D0. The fourth sampler 1227 may generate a fourth decision signal D0_3 by sampling the internal input signal IS_CAL based on the reference voltage VREF_CAL and the fourth sub-clock signal S_CLK3_D0.

The calibrator 1300b may include a first offset control cell (OCC1-1) 1321, a second offset control cell (OCC1-2) 1323, a third offset control cell (OCC1-3) 1325, a fourth offset control cell (OCC1-4) 1327 and a first control circuit 1351.

The first offset control cell 1321 may be included in the first sampler 1221, and may adjust an output level of the first sampler 1221 based on a first offset control signal OCON1_1. The second offset control cell 1323 may be included in the second sampler 1223, and may adjust an output level of the second sampler 1223 based on a second offset control signal OCON1_2. The third offset control cell 1325 may be included in the third sampler 1225, and may adjust an output level of the third sampler 1225 based on the third offset control signal OCON1_3. The fourth offset control cell 1327 may be included in the fourth sampler 1227, and may adjust an output level of the fourth sampler 1227 based on the fourth offset control signal OCON1_4. The first control circuit 1351 may generate the first, second, third and fourth offset control signals OCON1_1, OCON1_2, OCON1_3 and OCON1_4 based on the first, second, third and fourth decision signals D0_0, D0_1, D0_2 and D0_3.

The multi-level receiver 1200b may further include a fifth sampler 1231, a sixth sampler 1233, a seventh sampler 1235, an eighth sampler 1237, a ninth sampler 1241, a tenth sampler 1243, an eleventh sampler 1245 and a twelfth sampler 1247. The calibrator 1300b may further include a fifth offset control cell 1331, a ninth offset control cell 1341, a second control circuit 1353 and a third control circuit 1355. Although not illustrated in detail, the calibrator 1300b may further include a sixth offset control cell, a seventh offset control cell, an eighth offset control cell, a tenth offset control cell, an eleventh offset control cell and a twelfth offset control cell.

The fifth, sixth, seventh and eighth samplers 1231, 1233, 1235 and 1237 may operate based on a sampler clock signal S_CLK_D1, and may correspond to the second sampler 1230 in FIG. 5. As with the sampler clock signal S_CLK_D0, the sampler clock signal S_CLK_D1 may include a fifth sub-clock signal, a sixth sub-clock signal, a seventh sub-clock signal and an eighth sub-clock signal whose phases partially overlap. The fifth, sixth, seventh and eighth samplers 1231, 1233, 1235 and 1237 may generate fifth, sixth, seventh and eighth decision signals D1_0, D1_1, D1_2 and D1_3, respectively, by sampling the internal input signal IS_CAL based on the reference voltage VREF_CAL and the fifth, sixth, seventh and eighth sub-clock signals, respectively. The fifth offset control cell 1331 may be included in the fifth sampler 1231, and may adjust an output level of the fifth sampler 1231 based on a fifth offset control signal OCON2_1. The sixth, seventh and eighth offset control cells may be included in the sixth, seventh and eighth samplers 1233, 1235 and 1237, respectively, and may adjust output levels of the sixth, seventh and eighth samplers 1233, 1235 and 1237 based on sixth, seventh and eighth offset control signals OCON2_2, OCON2_3 and OCON2_4, respectively. The second control circuit 1353 may generate the fifth, sixth, seventh and eighth offset control signals OCON2_1, OCON2_2, OCON2_3 and OCON2_4 based on the fifth, sixth, seventh and eighth decision signals D1_0, D1_1, D1_2 and D1_3.

The ninth, tenth, eleventh and twelfth samplers 1241, 1243, 1245 and 1247 may operate based on a sampler clock signal S_CLK_D2, and may correspond to the third sampler 1240 in FIG. 5. As with the sampler clock signal S_CLK_D0, the sampler clock signal S_CLK_D2 may include a ninth sub-clock signal, a tenth sub-clock signal, an eleventh sub-clock signal and a twelfth sub-clock signal whose phases partially overlap. The ninth, tenth, eleventh and twelfth samplers 1241, 1243, 1245 and 1247 may generate ninth, tenth, eleventh and twelfth decision signals D2_0, D2_1, D2_2 and D2_3, respectively, by sampling the internal input signal IS_CAL based on the reference voltage VREF_CAL and the ninth, tenth, eleventh and twelfth sub-clock signals, respectively. The ninth offset control cell 1341 may be included in the ninth sampler 1241, and may adjust an output level of the ninth sampler 1241 based on a ninth offset control signal OCON3_1. The tenth, eleventh and twelfth offset control cells may be included in the tenth, eleventh and twelfth samplers 1243, 1245 and 1247, respectively, and may adjust output levels of the tenth, eleventh and twelfth samplers 1243, 1245 and 1247 based on tenth, eleventh and twelfth offset control signals OCON3_2, OCON3_3 and OCON3_4, respectively. The third control circuit 1355 may generate the ninth, tenth, eleventh and twelfth offset control signals OCON3_1, OCON3_2, OCON3_3 and OCON3_4 based on the ninth, tenth, eleventh and twelfth decision signals D2_0, D2_1, D2_2 and D2_3.

The calibrator 1300b may detect and compensate offset associated with the first, second, third and fourth samplers 1221, 1223, 1225 and 1227, may detect and compensate offset associated with the fifth, sixth, seventh and eighth samplers 1231, 1233, 1235 and 1237, may detect and compensate offset associated with the ninth, tenth, eleventh and twelfth samplers 1241, 1243, 1245 and 1247, and may correspond to the calibrator 1312 of FIG. 2B. For example, the control circuits 1351, 1353 and 1355 may correspond to the offset detection circuit 1314 in FIG. 2B, and the offset control cells 1321, 1323, 1325, 1327, 1331 and 1341 may correspond to the plurality of offset control cells 1316 in FIG. 2B.

Although not illustrated in detail, in the normal operation mode of FIG. 3B, the first, second, third and fourth samplers 1221, 1223, 1225 and 1227 may sample the multi-level input signal ML_IN using the first reference voltage having the first reference level VLREF_H in FIG. 4B, the fifth, sixth, seventh and eighth samplers 1231, 1233, 1235 and 1237 may sample the multi-level input signal ML_IN using the second reference voltage having the second reference level VLREF_M in FIG. 4B, the ninth, tenth, eleventh and twelfth samplers 1241, 1243, 1245 and 1247 may sample the multi-level input signal ML_IN using the third reference voltage having the third reference level VLREF_L in FIG. 4B, and a voltage level of the multi-level input signal ML_IN may be determined and the multi-level data corresponding thereto may be generated based on the decision signals D0_0, D0_1, D0_2, D0_3, D1_0, D1_1, D1_2, 1_3, D2_0, D2_1, D2_2 and D2_3 generated by results of the sampling operations.

FIGS. 11, 12, 13A and 13B are diagrams for describing an operation of a memory device of FIGS. 10A and 10B according to example embodiments.

Figure 11:
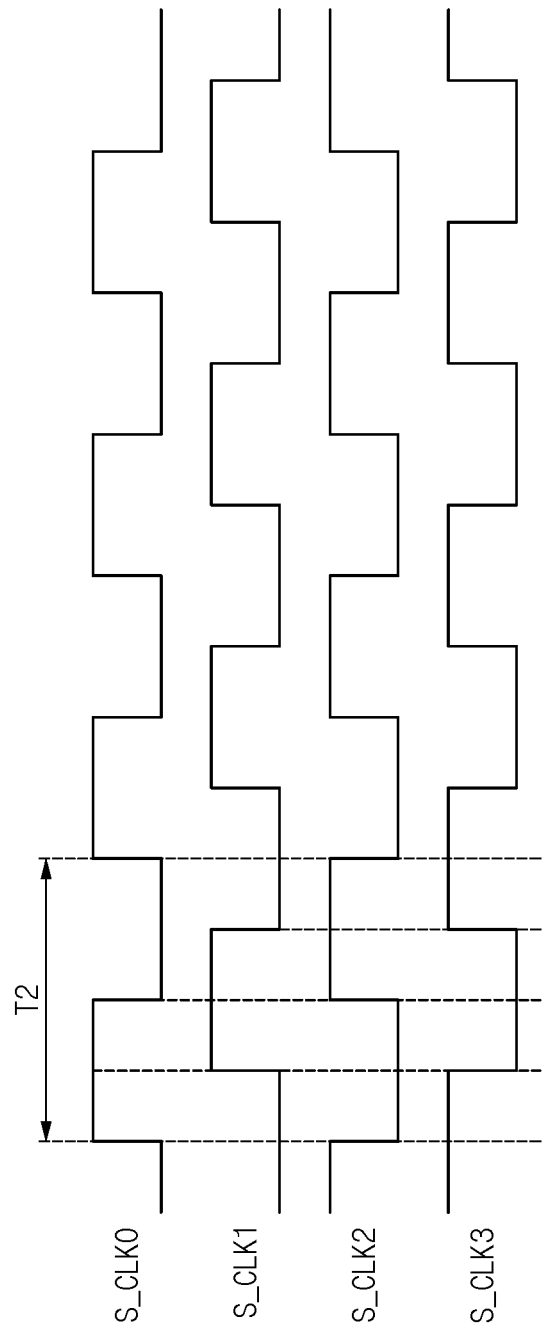

Referring to FIG. 11, example waveforms of four sub-clock signals S_CLK0, S_CLK1, S_CLK2 and S_CLK3 included in each of the sampler clock signals S_CLK_D0, S_CLK_D1 and S_CLK_D2 are illustrated.

The first sub-clock signal S_CLK0 may be substantially the same as the second clock signal S_CLK in FIG. 6. Among the first to fourth sub-clock signals S_CLK0, S_CLK1, S_CLK2 and S_CLK3, high levels of two adjacent sub-clock signals (e.g., the first and second sub-clock signals S_CLK0 and S_CLK1) may partially overlap. For example, the second to fourth sub-clock signals S_CLK1, S_CLK2 and S_CLK3 may have a phase difference of about 90 degrees, about 180 degrees and about 270 degrees from the first sub-clock signal S_CLK0, respectively. For example, each of the sampler clock signals S_CLK_D0, S_CLK_D1 and S_CLK_D2 may be referred to as a 4-phase clock signal.

Referring to FIGS. 7A and 12, an example of values (e.g., logic levels) of the first, second, third and fourth decision signals D0_O, D0_1, D0_2 and D0_3 generated as a result of the sampling operation in the calibration mode is illustrated.

It may be determined whether the offset has occurred by performing the sampling operation using the first, second, third and fourth samplers 1221, 1223, 1225 and 1227 based on the same internal input signal IS_CAL and the same reference voltage VREF_CAL. For example, when a value of one of the first, second, third and fourth decision signals D0_0, D0_1, D0_2 and D0_3 generated from the first, second, third and fourth samplers 1221, 1223, 1225 and 1227 is different from values of the remaining decision signals, it may be determined that the offset has occurred.

For example, in a normal case where the offset does not occur, the level of the internal input signal IS_CAL may be higher than the reference level VLREF_CAL at sampling time points ts11, ts12, ts13 and ts14, and thus the first, second, third and fourth samplers 1221, 1223, 1225 and 1227 may generate the first, second, third and fourth decision signals D0_0, D0_1, D0_2 and D0_3 having the value of '1'. Similarly, the level of the internal input signal IS_CAL may be lower than the reference level VLREF_CAL at sampling time points ts15, ts16, ts17 and ts18, and thus the first, second, third and fourth samplers 1221, 1223, 1225 and 1227 may generate the first, second, third and fourth decision signals D0_0, D0_1, D0_2 and D0_3 having the value of '0'.

On the other hand, when only the third decision signal D0_2 has the value of '0' and the first, second and fourth decision signals D0_0, D0_1 and D0_3 have the value of '1' at the sampling point ts14, it may be determined that the offset occurs associated with the third sampler 1225, and thus the output level of the third sampler 1225 may be adjusted using the third offset control signal OCON1_3 and the third offset control cell 1325.

In other words, the offset direction may be detected, determined and compensated by driving the first, second, third and fourth samplers 1221, 1223, 1225 and 1227 and by comparing output averages of the first, second, third and fourth samplers 1221, 1223, 1225 and 1227.

Although example embodiments are described based on the example where the output level of the sampler corresponding to the decision signal having the different value is adjusted when the value of one of the first, second, third and fourth decision signals D0_0, D0_1, D0_2 and D0_3 is different from the values of the remaining decision signals, example embodiments are not limited thereto. For example, one of the first, second, third and fourth decision signals D0_0, D0_1, D0_2 and D0_3 may be set as a reference value, and output levels of samplers corresponding to decision signals other than the reference value may be adjusted. For example, when the third decision signal D0_2 is set as a reference value, and when the value of at least one of the first, second and fourth decision signals D0_0, D0_1 and D0_3 is different from the value of the third decision signal D0_2, at least one of the output levels of the first, second and fourth samplers 1221, 1223 and 1227 may be adjusted. For example, when the third decision signal D0_2 has the value of '0' and the first, second and fourth decision signals D0_0, D0_1 and D0_3 have the value of '1', the output levels of the first, second and fourth samplers 1221, 1223 and 1227 may be adjusted rather than adjusting the output level of the third sampler 1225, and thus the offset may be compensated.

Although not illustrated in detail, the above-described offset detection and calibration operation may also be performed on the fifth, sixth, seventh and eighth samplers 1231, 1233, 1235 and 1237, and the above-described offset detection and calibration operation may also be performed on the ninth, tenth, eleventh and twelfth samplers 1241, 1243, 1245 and 1247.

Figure 13A:
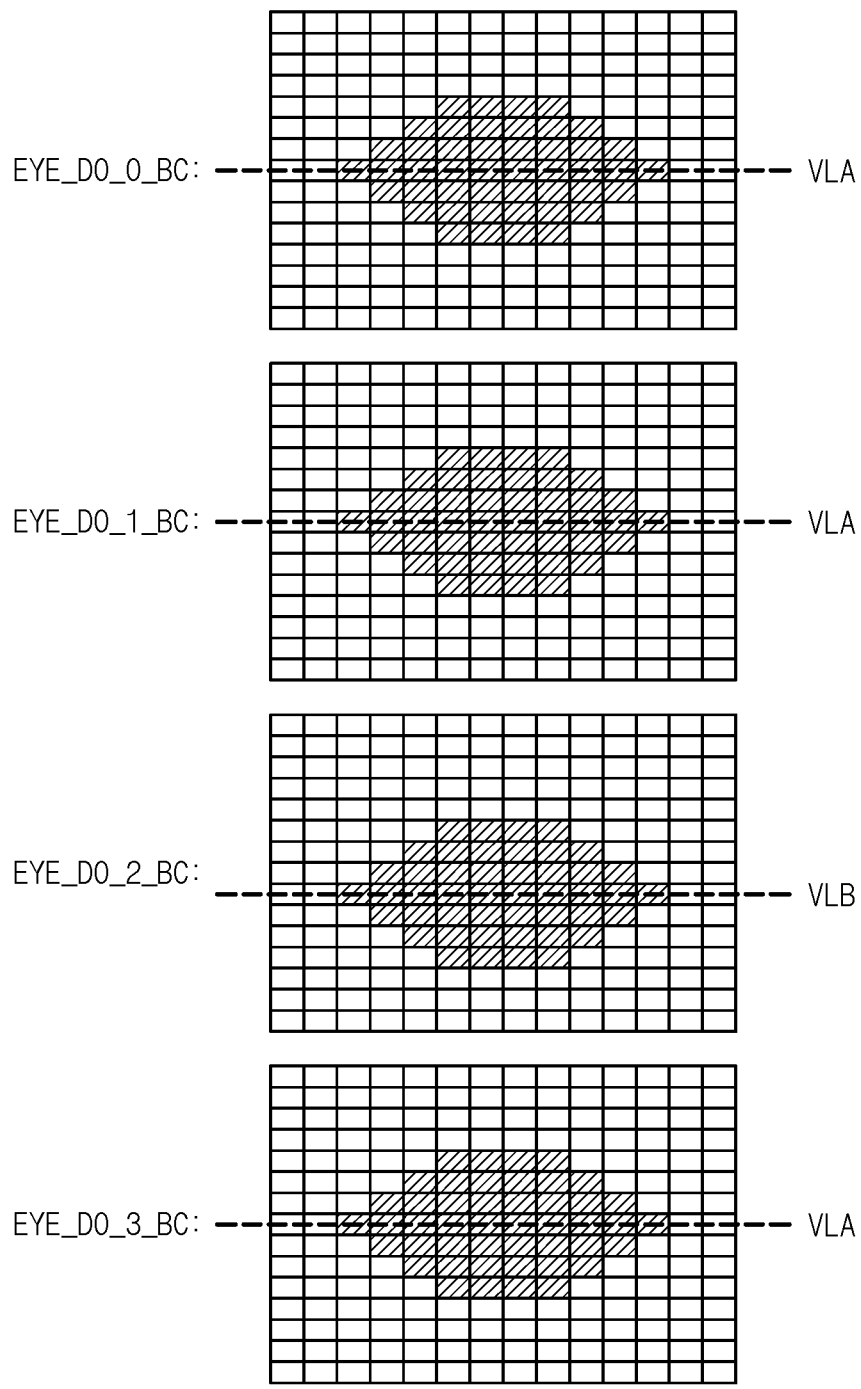
Figure 13B:
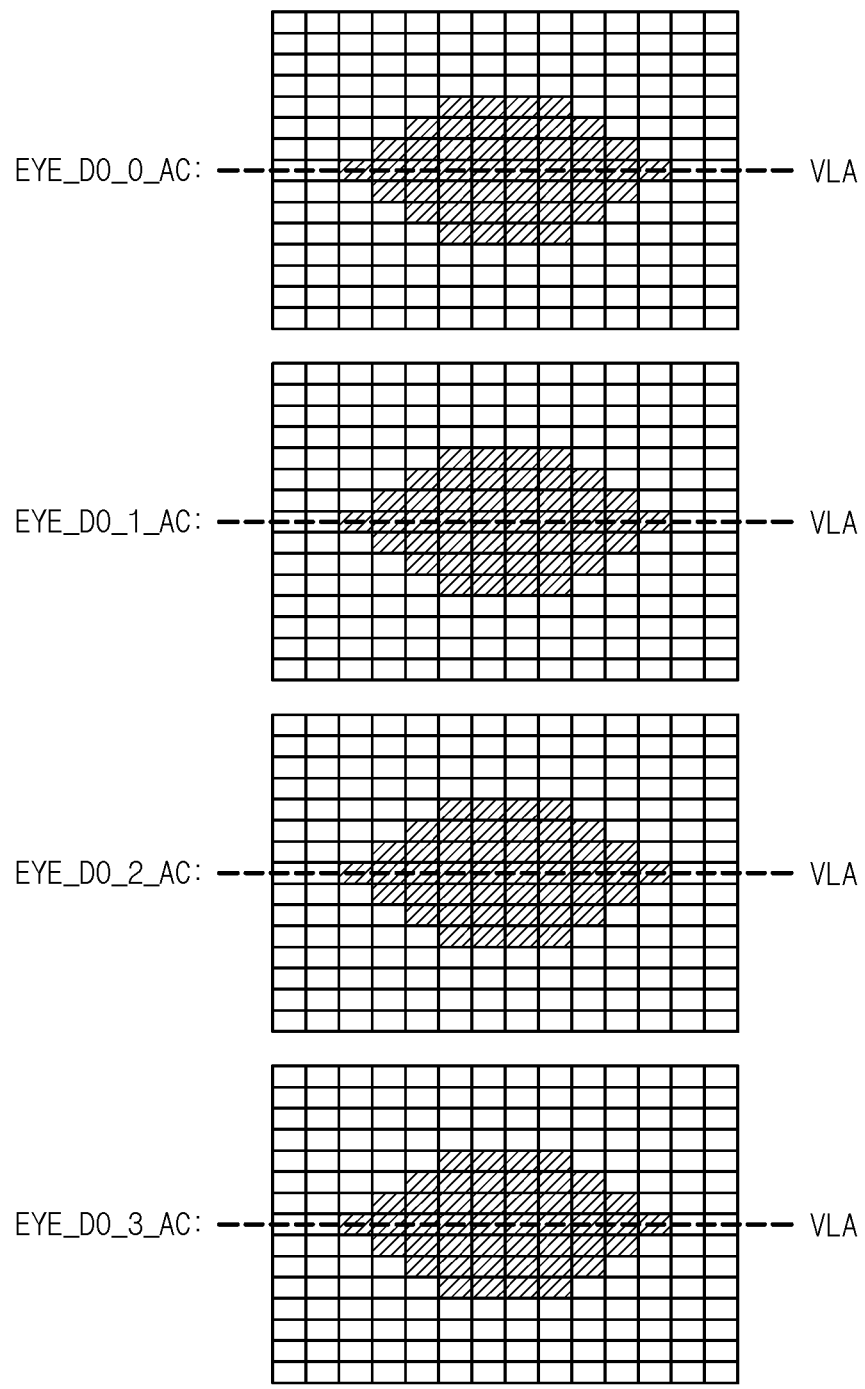

Referring to FIGS. 13A and 13B, examples of outputs of the first, second, third and fourth samplers 1221, 1223, 1225 and 1227 are illustrated. For example, eye diagrams or valid windows of the first, second, third and fourth decision signals D0_0, D0_1, D0_2 and D0_3 are illustrated in FIGS. 13A and 13B.

As illustrated in FIG. 13A, before the calibration operation is performed, eye diagrams EYE_D0_0_BC, EYE_D0_1_BC and EYE_D0_3_BC of the first, second and fourth decision signals D0_0, D0_1 and D0_3 may be different from an eye diagram EYE_D0_2_BC of the second decision signal D0_2. For example, an output average level VLA of the first, second and fourth decision signals D0_0, D0_1, and D0_3 and an output average level VLB of the third decision signal D0_2 may be different from each other, and offset mismatch (or inconsistency) and/or offset error may exist.

As illustrated in FIG. 13B, after the calibration operation is performed, eye diagrams EYE_D0_0_AC, EYE_D0_1_AC, EYE_D0_2_AC and EYE_D0_3_AC of the first, second, third and fourth decision signals D0_0, D0_1, D0_2 and D0_3 may be substantially the same as each other. For example, the output average level VLA of the first, second, third and fourth decision signals D0_0, D0_1, D0_2 and D0_3 may be substantially the same as each other, and the offset and the DQ margin may be improved or enhanced.

In some example embodiments, the calibrator 1300b included in the memory device 1000b may additionally perform the timing skew calibration operation described with reference to FIGS. 5, 6, 7A to 7D, 8, 9A, and 9B. In other words, when timing skew has occurred between a first group of the samplers 1221, 1223, 1225 and 1227, a second group of the samplers 1231, 1233, 1235 and 1237, and a third group of the samplers 1241, 1243, 1245 and 1247, the calibrator 1300b may further compensate the timing skew.

Figure 14:
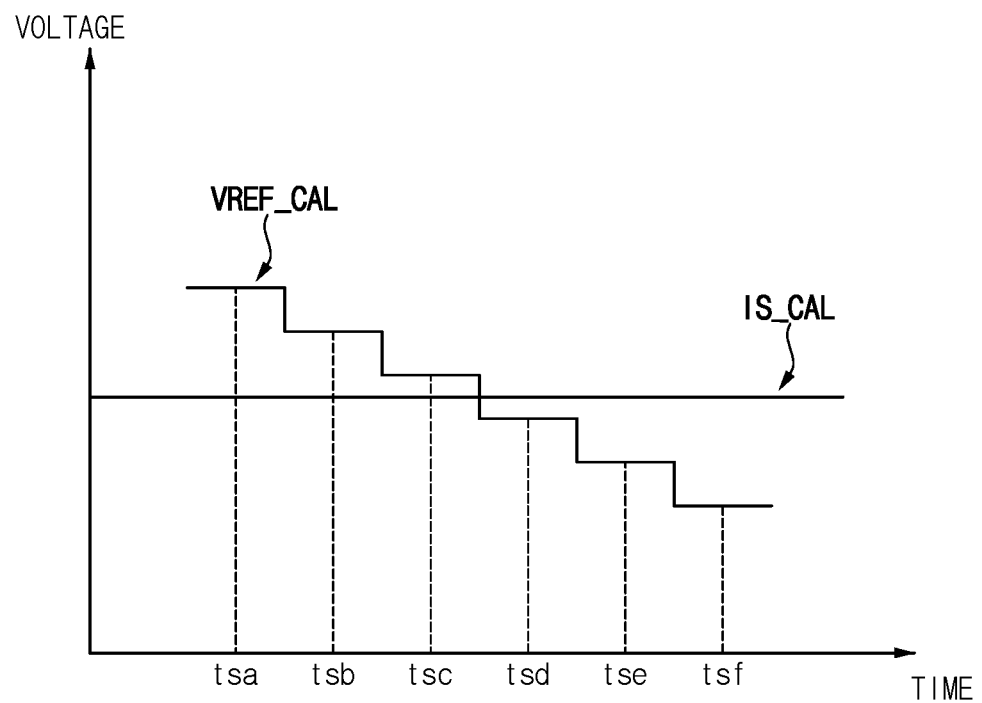
FIG. 14 is a diagram for describing an operation of memory devices of FIGS. 5, 10A and 10B according to example embodiments.

FIG. 14 is a diagram for describing an operation of memory devices of FIGS. 5, 10A and 10B according to example embodiments.

Referring to FIG. 14, an example operation of sampling the internal input signal IS_CAL using the reference voltage VREF_CAL and the second clock signal S_CLK is illustrated. Unlike the examples of FIGS. 7A, 7B, 7C and 7D, the internal input signal IS_CAL may be sampled using the internal input signal IS_CAL having a fixed level and the reference voltage VREF_CAL having a variable level, and then the calibration operation may be performed based on a result of the sampling operation.

Figure 15:
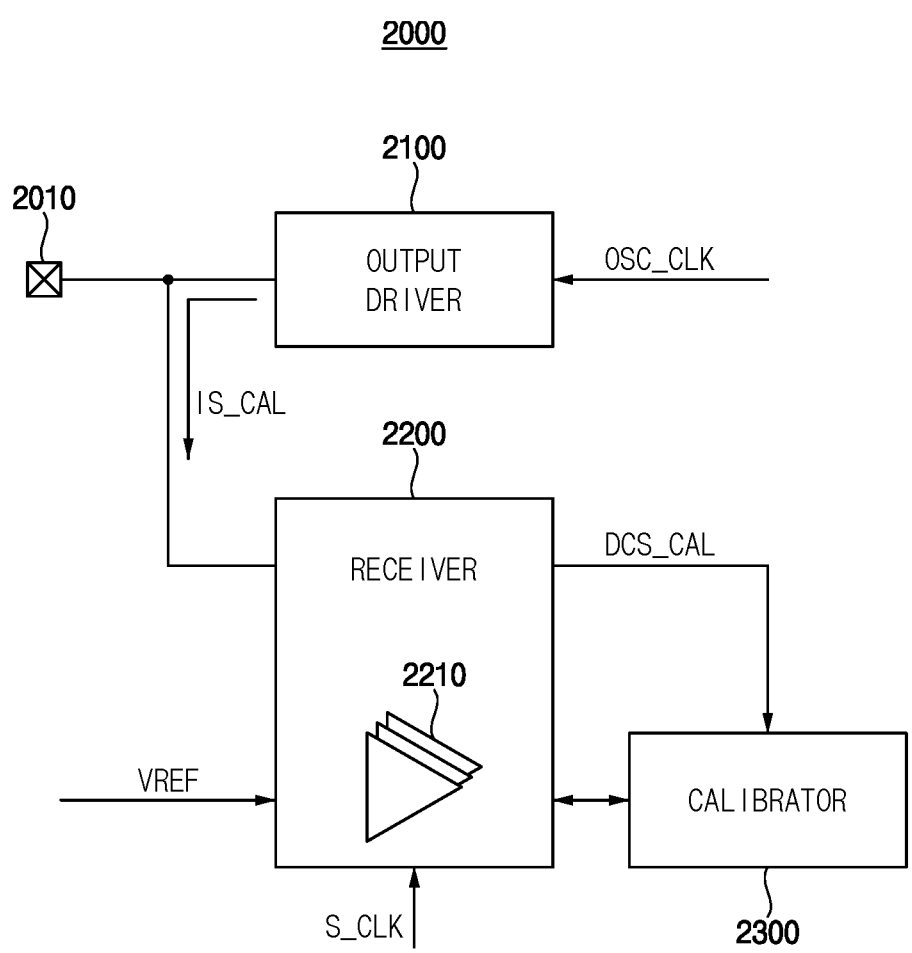
FIG. 15 is a block diagram illustrating a memory device according to example embodiments.

FIG. 15 is a block diagram illustrating a memory device according to example embodiments. The descriptions repeated with FIG. 1 will be omitted.

Referring to FIG. 15, a memory device 2000 includes a data I/O pin 2010, an output driver 2100, a receiver 2200 and a calibrator 2300.

In some example embodiments, the memory device 2000 may operate based on a non-return-to-zero (NRZ) scheme. For example, in a normal operation mode, the output driver 2100 may generate an NRZ signal based on single-bit data, and the receiver 2200 may generate a plurality of decision signals for generating single-bit data based on an NRZ signal. For example, the NRZ signal may have one of two voltage levels that are different from each other during one unit interval, and the single-bit data may include one bit. Detailed operations of the memory device 2000 in the normal operation mode will be described with reference to FIGS. 17A and 17B.

In some example embodiments, the memory device 2000 may operate in a calibration mode different from the normal operation mode. For example, the memory device 2000 may include the calibrator 2300 for performing an operation in the calibration mode. For example, in the calibration mode, the calibrator 2300 may detect and compensate offset associated with the receiver 2200. FIG. 15 illustrates a detailed operation of the memory device 2000 in the calibration mode.

The output driver 2100 is connected to the data I/O pin 2010, and generates an internal input signal IS_CAL based on a first clock signal OSC_CLK.

The receiver 2200 is connected to the data I/O pin 2010, and includes a plurality of samplers 2210. The plurality of samplers 2210 generate a plurality of decision signals DCS_CAL by sampling the internal input signal IS_CAL based on a reference voltage VREF and a second clock signal S_CLK. For example, as described with reference to FIG. 11, the second clock signal S_CLK may include a plurality of sub-clock signals whose phases partially overlap.

In some example embodiments, when a calibration operation is performed in the calibration mode, both the output driver 2100 and the receiver 2200 may be enabled and operate.

The calibrator 2300 detects and compensates offset associated with the plurality of samplers 2210 based on the plurality of decision signals DCS_CAL.

In some example embodiments, in the calibration mode, the offset associated with the plurality of samplers 2210 may be detected and compensated using only the internal input signal IS_CAL, without an external input signal received from an outside (e.g., from an external device) through the data I/O pin 2010. For example, in the calibration mode, the data I/O pin 2010 may have a high impedance state to prevent a reception of the external input signal.

Figure 16:
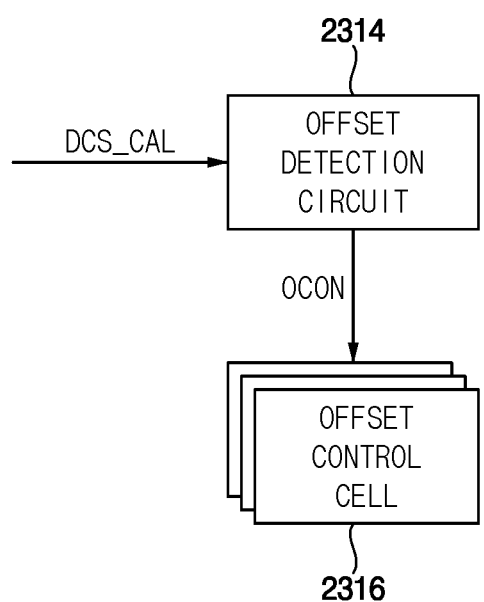
FIG. 16 is a block diagram illustrating an example of a calibrator included in a memory device according to example embodiments.

FIG. 16 is a block diagram illustrating an example of a calibrator included in a memory device according to example embodiments. The descriptions repeated with FIG. 2B will be omitted.

Referring to FIG. 16, a calibrator 2312 may include an offset detection circuit 2314 and a plurality of offset control cells 2316. The offset detection circuit 2314 and the plurality of offset control cells 2316 may be substantially the same as the offset detection circuit 1314 and the plurality of offset control cells 1316 in FIG. 2B, respectively.

Figure 17A:
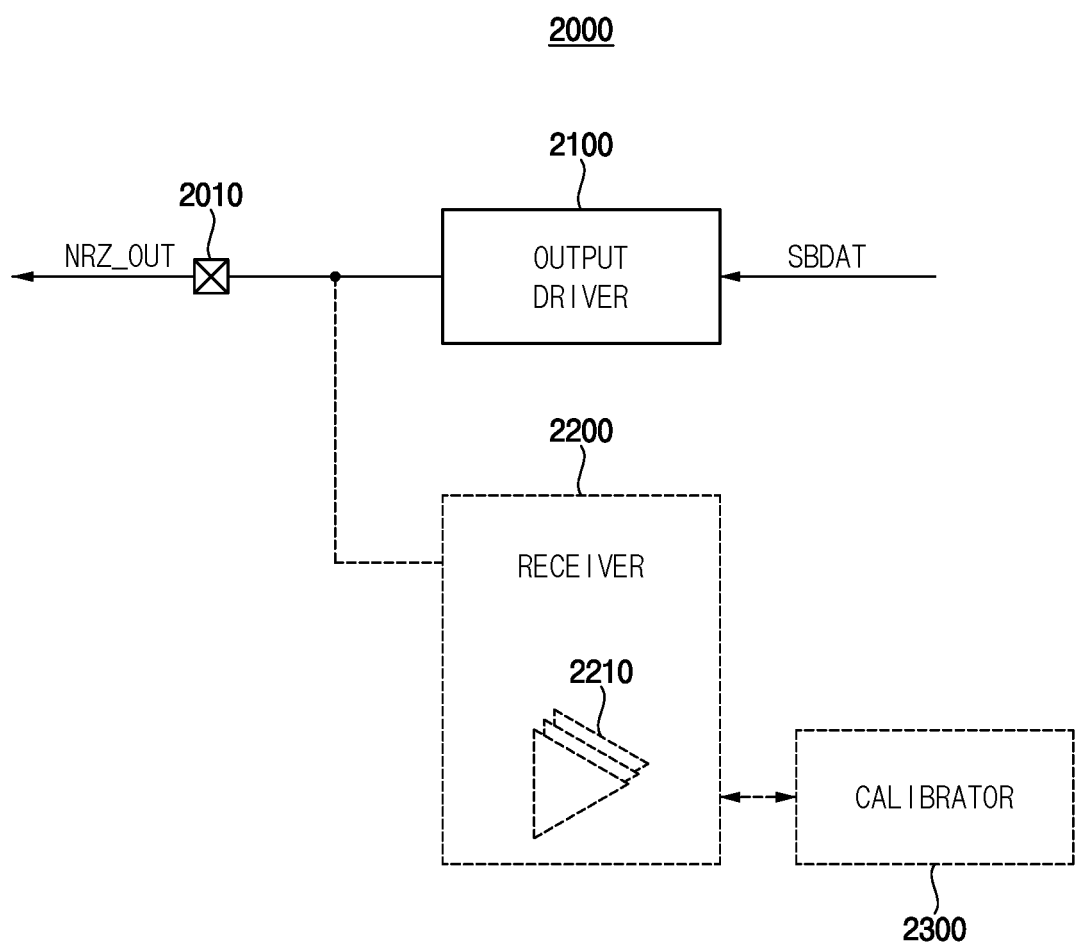
FIGS. 17A and 17B are block diagrams illustrating a memory device according to example embodiments.
Figure 17B:
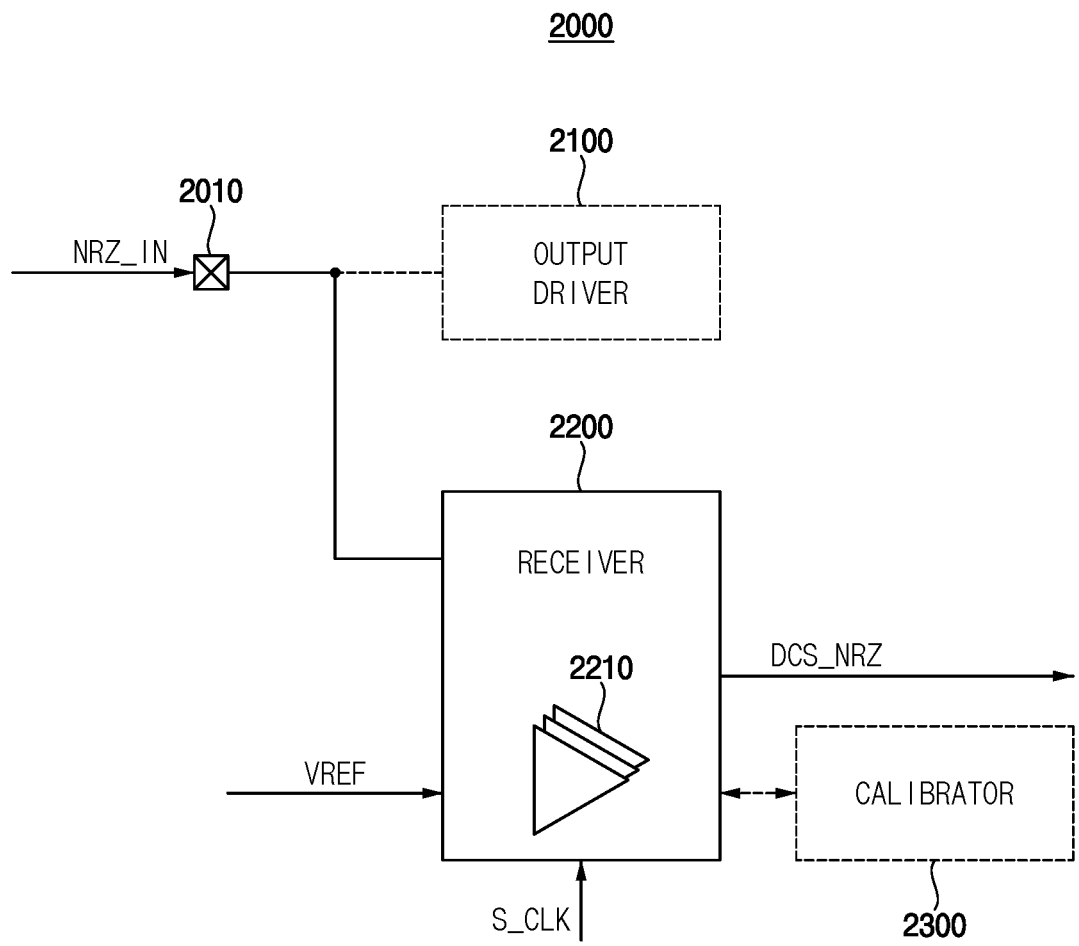

FIGS. 17A and 17B are block diagrams illustrating a memory device according to example embodiments. The descriptions repeated with FIGS. 3A, 3B and 15 will be omitted.

Referring to FIGS. 17A and 17B, operations of the memory device 2000 in the normal operation mode are illustrated.

As illustrated in FIG. 17A, in the normal operation mode subsequent to the calibration mode, the memory device 2000 may perform a data output operation. For example, the output driver 2100 may generate an NRZ output signal NRZ_OUT based on single-bit data SBDAT, and the NRZ output signal NRZ_OUT may be output through the data I/O pin 2010.

As illustrated in FIG. 17B, in the normal operation mode subsequent to the calibration mode, the memory device 2000 may perform a data reception operation. For example, an NRZ input signal NRZ_IN may be received through the data I/O pin 2010, and the plurality of samplers 2210 included in the receiver 2200 may generate a plurality of decision signals DCS_NRZ by sampling the NRZ input signal NRZ_IN based on the reference voltages VREF and the second clock signal S_CLK. The plurality of samplers 2210 may operate using the same reference voltage (e.g., the reference voltage VREF) in the calibration mode and the normal operation mode.

In some example embodiments, when the data output operation or the data reception operation is performed in the normal operation mode, one of the output driver 2100 and the multi-level receiver 2200 may be enabled and operate. In some example embodiments, when the data output operation or the data reception operation is performed in the normal operation mode, the calibrator 2300 may be disabled.

Figure 18:
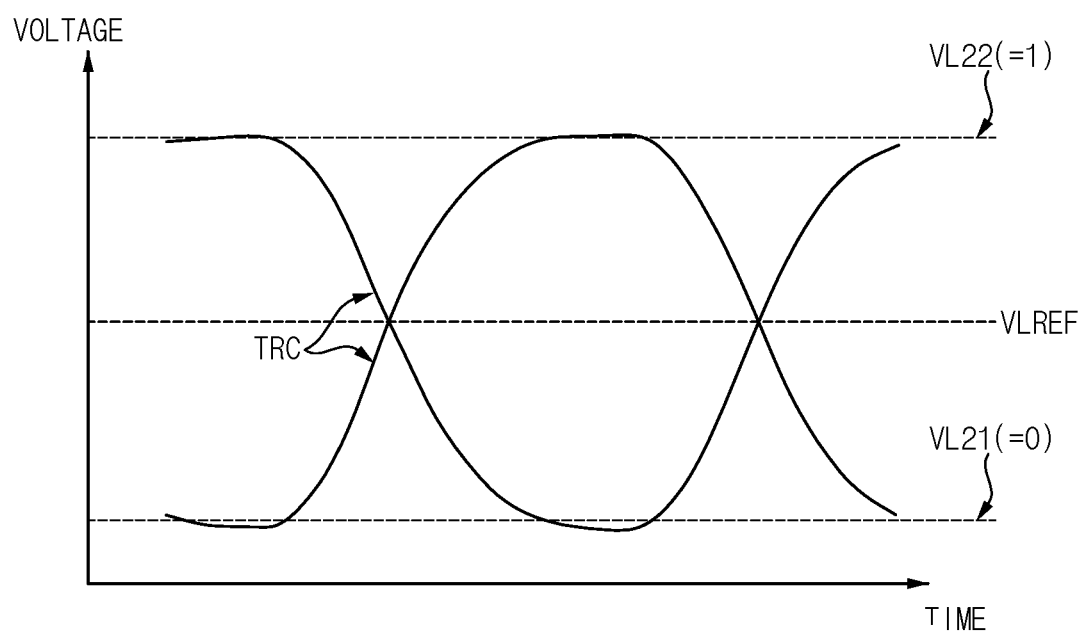
FIG. 18 is a diagram for describing an NRZ signal that is input to or output from a memory device according to example embodiments.

FIG. 18 is a diagram for describing an NRZ signal that is input to or output from a memory device according to example embodiments.

Referring to FIG. 18, an ideal eye diagram of a data signal (e.g., an NRZ signal) generated based on the NRZ scheme that is an example of the 2-level signaling scheme is illustrated. For example, the NRZ signal of FIG. 18 may be an example of the NRZ output signal NRZ_OUT in FIG. 17A or the NRZ input signal NRZ_IN in FIG. 17B.

An eye diagram may be used to indicate the quality of signals in high-speed transmissions. For example, the eye diagram in FIG. 18 may represent two symbols of a signal (e.g., '0' and '1'), and each of the two symbols may be represented by a respective one of different voltage levels (e.g., voltage amplitudes) VL21 and VL22. A reference level VLREF may be a voltage level between the voltage levels VL21 and VL22. The voltage level (e.g., the symbol) of the data signal may be decided or determined based on a result of comparing the data signal with the reference level VLREF.

In some example embodiments, the voltage levels VL21 and VL22 and the reference level VLREF may be substantially the same as the voltage levels VL11 and VL14 and the second reference level VLREF_M in FIGS. 4A and 4B, respectively. However, example embodiments are not limited thereto.

Figure 19:
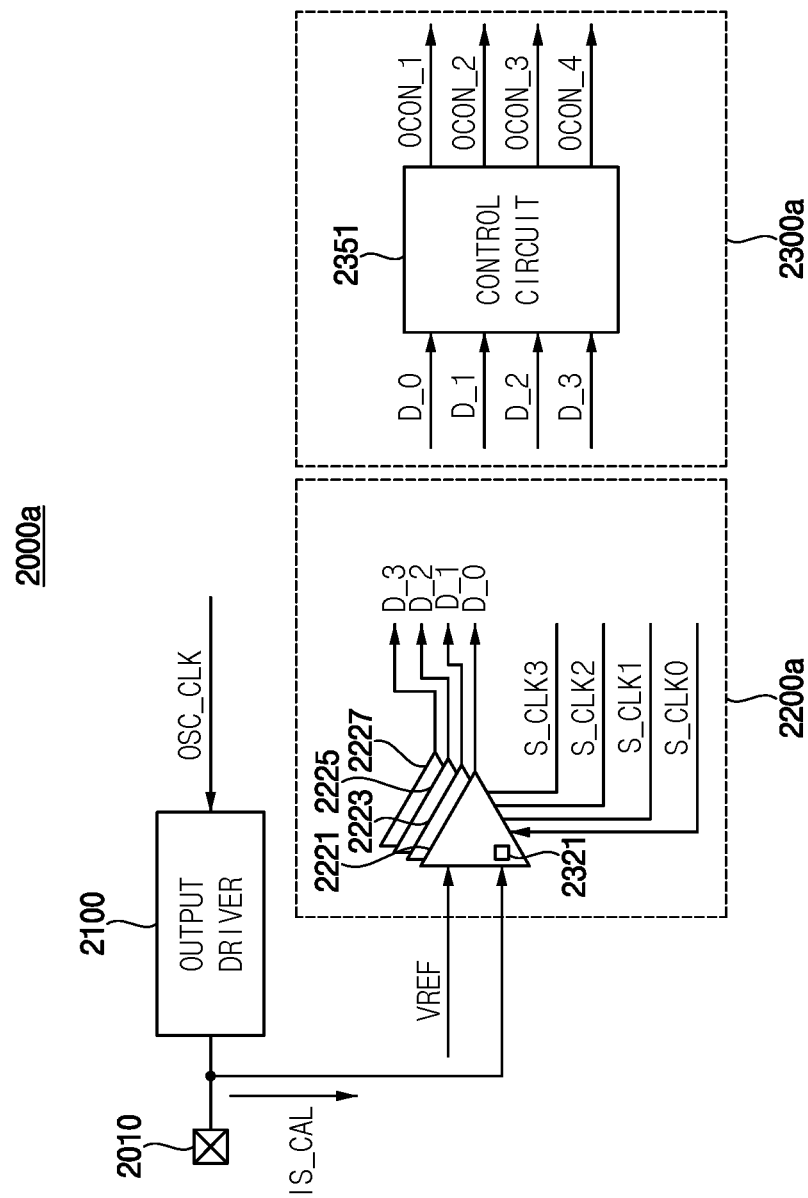
FIG. 19 is a block diagram illustrating an example of a memory device of FIG. 15 according to example embodiments.

FIG. 19 is a block diagram illustrating an example of a memory device of FIG. 15 according to example embodiments. The descriptions repeated with FIGS. 10A and 10B will be omitted.

Referring to FIG. 19, a memory device 2000a includes a data I/O pin 2010, an output driver 2100, a receiver 2200a and a calibrator 2300a.

The data I/O pin 2010 and the output driver 2100 may be substantially the same as those described with reference to FIG. 15, and the descriptions repeated with FIG. 15 will be omitted.

The receiver 2200a may include a first sampler 2221, a second sampler 2223, a third sampler 2225 and a fourth sampler 2227. The first, second, third and fourth samplers 2221, 2223, 2225 and 2227 may generate first, second, third and fourth decision signals D_0, D_1, D_2 and D_3 by sampling the internal input signal IS_CAL based on the reference voltage VREF and the sub-clock signals S_CLK0, S_CLK1, S_CLK2 and S_CLK3 whose phases partially overlap.

The calibrator 2300a may include a first offset control cell 2321 and a control circuit 2351. Although not illustrated in detail, the calibrator 2300a may further include a second offset control cell, a third offset control cell and a fourth offset control cell. The first offset control cell 2321 may be included in the first sampler 2221, and may adjust an output level of the first sampler 2221 based on a first offset control signal OCON_1. The second, third and fourth offset control cells may be included in the second, third and fourth samplers 2223, 2225 and 2227, respectively, and may adjust output levels of the second, third and fourth samplers 2223, 2225 and 2227 based on second, third and fourth offset control signals OCON_2, OCON_3 and OCON_4, respectively. The control circuit 2351 may generate the first, second, third and fourth offset control signals OCON_1, OCON_2, OCON_3 and OCON_4 based on the first, second, third and fourth decision signals D_0, D_1, D_2 and D_3.

The samplers 2221, 2223, 2225 and 2227, the offset control cell 2321, the control circuit 2351, the sub-clock signals S_CLK0, S_CLK1, S_CLK2 and S_CLK3, the decision signals D_0, D_1, D_2 and D_3, and the offset control signals OCON_1, OCON_2, OCON_3 and OCON_4 may correspond to the samplers 1221, 1223, 1225 and 1227, the offset control cell 1321, the control circuit 1351, the sub-clock signals S_CLK0_D0, S_CLK1_D0, S_CLK2_D0 and S_CLK3_D0, the decision signals D0_0, D0_1, D0_2 and D0_3, and the offset control signals OCON1_1, OCON1_2, OCON1_3 and OCON1_4 in FIGS. 10A and 10B, respectively. The receiver 2200a and the calibrator 2300a may perform the offset calibration operation similar to that described with reference to FIGS. 11, 12, 13A and 13B.

Figure 20:
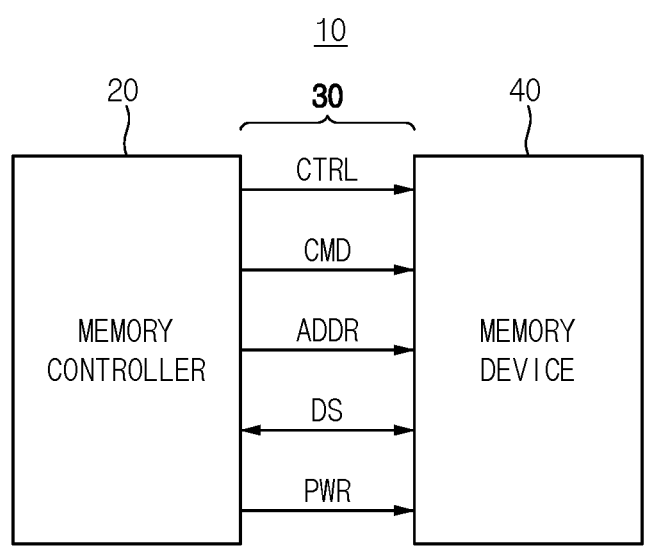
FIG. 20 is a block diagram illustrating a memory system according to example embodiments.

FIG. 20 is a block diagram illustrating a memory system according to example embodiments.

Referring to FIG. 20, a memory system 10 includes a memory controller 20 and a memory device 40. The memory system 10 may further include a plurality of signal lines 30 that electrically connect the memory controller 20 to the memory device 40.

The memory device 40 is controlled by the memory controller 20. For example, based on requests from a host (not illustrated), the memory controller 20 may store (e.g., write or program) data into the memory device 40, or may retrieve (e.g., read or sense) data from the memory device 40.

The plurality of signal lines 30 may include control lines, command lines, address lines, data input/output (I/O) lines and power lines. The memory controller 20 may transmit a command CMD, an address ADDR and a control signal CTRL to the memory device 40 via the command lines, the address lines and the control lines, may exchange a data signal DS with the memory device 40 via the data I/O lines, and may transmit a power supply voltage PWR to the memory device 40 via the power lines. For example, the data signal DS may be the multi-level signal or the NRZ signal that is transmitted and/or received according to example embodiments. Although not illustrated in FIG. 20, the plurality of signal lines 30 may further include data strobe signal (DQS) lines for transmitting a DQS signal.

Figure 21A:
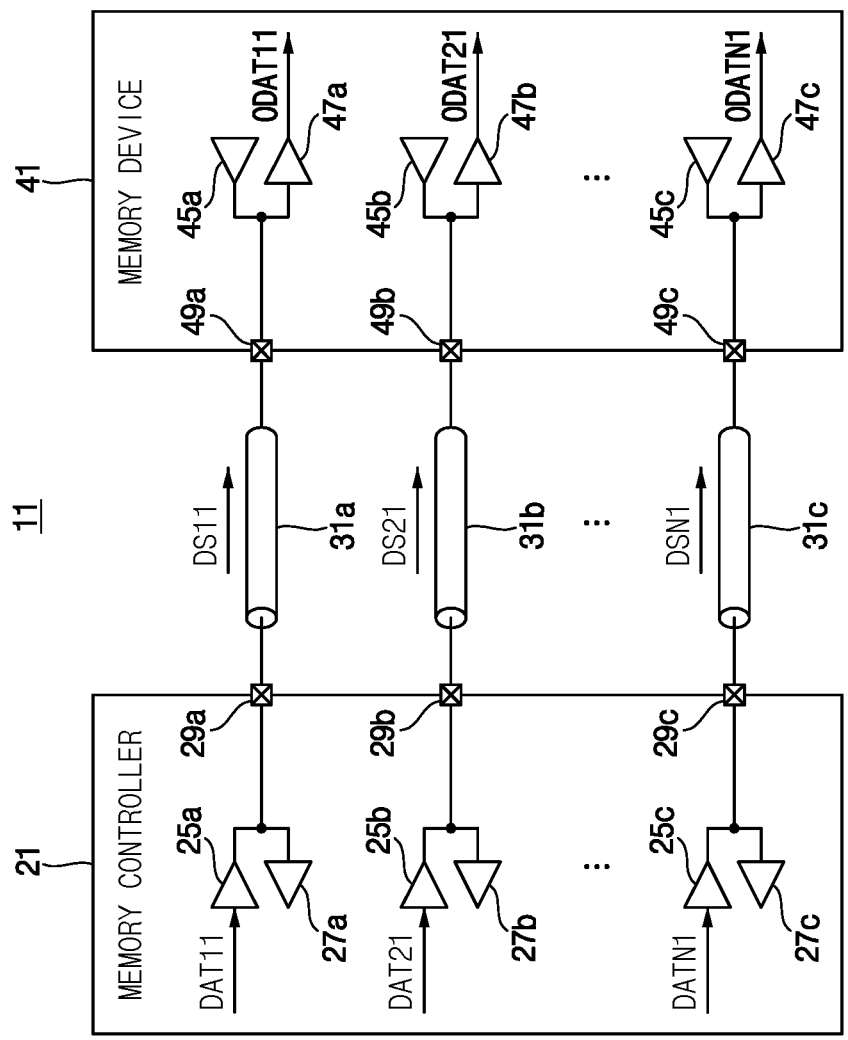
FIGS. 21A and 21B are block diagrams illustrating an example of a memory system of FIG. 20 according to example embodiments.
Figure 21B:
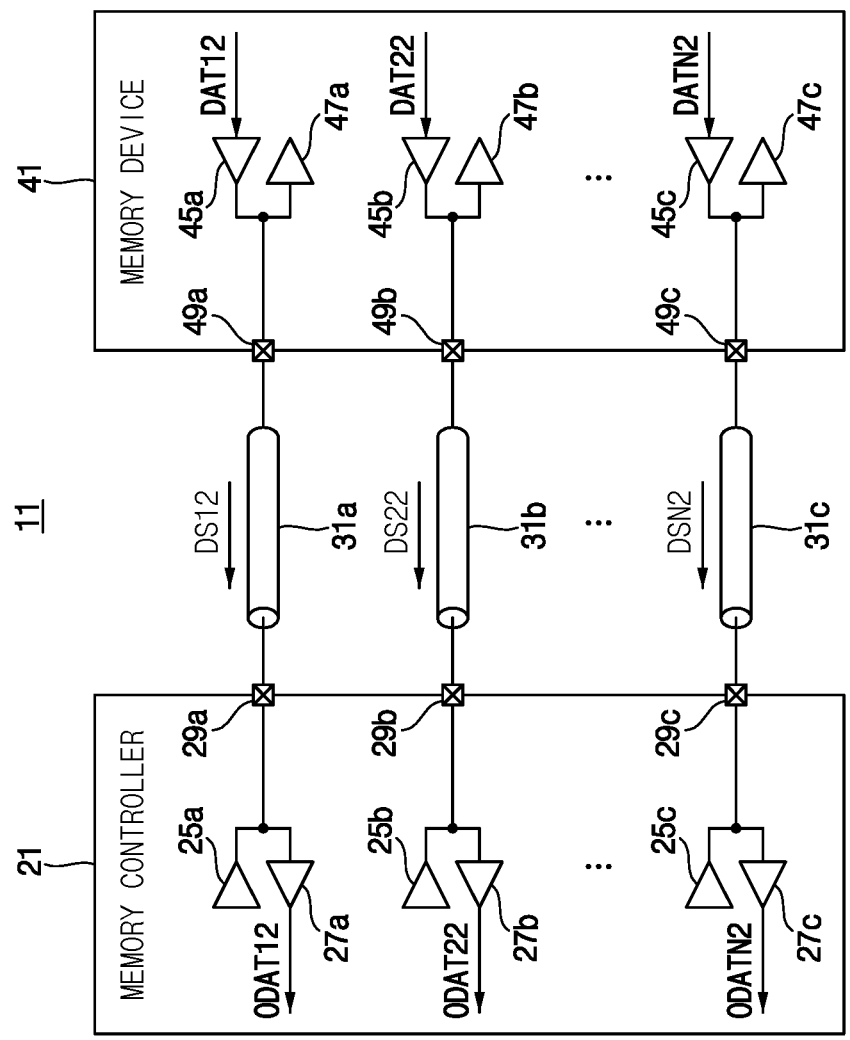

FIGS. 21A and 21B are block diagrams illustrating an example of a memory system of FIG. 20 according to example embodiments.

Referring to FIGS. 21A and 21B, a memory system 11 includes a memory controller 21, a memory device 41 and a plurality of channels 31a, 31b and 31c. For example, the number of the channels 31a, 31b and 31c may be N, where N is a positive integer greater than or equal to two.

The memory controller 21 may include a plurality of transmitters 25a, 25b and 25c, a plurality of receivers 27a, 27b and 27c, and a plurality of data I/O pads 29a, 29b and 29c. The memory device 41 may include a plurality of transmitters 45a, 45b and 45c, a plurality of receivers 47a, 47b and 47c, and a plurality of data I/O pads 49a, 49b and 49c.

Each of the plurality of transmitters 25a, 25b, 25c, 45a, 45b and 45c may generate the multi-level signal or the NRZ signal. In example embodiments, each of the plurality of transmitters 25a, 25b, 25c, 45a, 45b and 45c may employ one of the output drivers 1100 and 2100 of FIGS. 1, 5, 10A, 15, and 19. Each of the plurality of receivers 27a, 27b, 27c, 47a, 47b and 47c may receive the multi-level signal or the NRZ signal. In example embodiments, each of the plurality of receivers 27a, 27b, 27c, 47a, 47b and 47c may employ one of the multi-level receivers 1200, 1200a, 1200b, 2200, and 2200a of FIGS. 1, 5, 10A, 15, and 19. The memory controller 21 and/or the memory device 41 may include one of the calibrators described above in FIGS. 1, 2A, 2B, 5, 10A, 15, 16, and 19 for compensating at least one of the timing skew and the offset according to example embodiments.

Each of the plurality of data I/O pads 29a, 29b, 29c, 49a, 49b and 49c may be connected to a respective one of the plurality of transmitters 25a, 25b, 25c, 45a, 45b and 45c and a respective one of the plurality of receivers 27a, 27b, 27c, 47a, 47b and 47c.

The plurality of channels 31a, 31b and 31c may connect the memory controller 21 with the memory device 41. Each of the plurality of channels 31a, 31b and 31c may be connected to a respective one of the plurality of transmitters 25a, 25b and 25c and a respective one of the plurality of receivers 27a, 27b and 27c through a respective one of the plurality of data I/O pads 29a, 29b and 29c. Similarly, each of the plurality of channels 31a, 31b and 31c may be connected to a respective one of the plurality of transmitters 45a, 45b and 45c and a respective one of the plurality of receivers 47a, 47b and 47c through a respective one of the plurality of data I/O pads 49a, 49b and 49c. The multi-level signal or the NRZ signal may be transmitted through each of the plurality of channels 31a, 31b and 31c.

FIG. 21A illustrates an operation of transferring data from the memory controller 21 to the memory device 41. For example, the transmitter 25a may generate a data signal DS11 based on input data DAT11, the data signal DS11 may be transmitted from the memory controller 21 to the memory device 41 through the channel 31a, and the receiver 47a may receive the data signal DS11 to obtain output data ODAT11 corresponding to the input data DAT11. Similarly, the transmitter 25b may generate a data signal DS21 based on input data DAT21, the data signal DS21 may be transmitted to the memory device 41 through the channel 31b, and the receiver 47b may receive the data signal DS21 to obtain output data ODAT21 corresponding to the input data DAT21. The transmitter 25c may generate a data signal DSN1 based on input data DATN1, the data signal DSN1 may be transmitted to the memory device 41 through the channel 31c, and the receiver 47c may receive the data signal DSN1 to obtain output data ODATN1 corresponding to the input data DATN1. For example, the input data DAT11, DAT21 and DATN1 may be write data to be stored into the memory device 41, and a write command and a write address for storing the write data may be provided to the memory device 41 together with the write data.

FIG. 21B illustrates an operation of transferring data from the memory device 41 to the memory controller 21. For example, the transmitter 45a may generate a data signal DS12 based on input data DAT12, the data signal DS12 may be transmitted from the memory device 41 to the memory controller 21 through the channel 31a, and the receiver 27a may receive the data signal DS12 to obtain output data ODAT12 corresponding to the input data DAT12. Similarly, the transmitter 45b may generate a data signal DS22 based on input data DAT22, the data signal DS22 may be transmitted to the memory controller 21 through the channel 31b, and the receiver 27b may receive the data signal DS22 to obtain output data ODAT22 corresponding to the input data DAT22. The transmitter 45c may generate a data signal DSN2 based on input data DATN2, the data signal DSN2 may be transmitted to the memory controller 21 through the channel 31c, and the receiver 27c may receive the data signal DSN2 to obtain output data ODATN2 corresponding to the input data DATN2. For example, the input data DAT12, DAT22 and DATN2 may be read data retrieved from the memory device 41, and a read command and a read address for retrieving the read data may be provided to the memory device 41.

Figure 22:
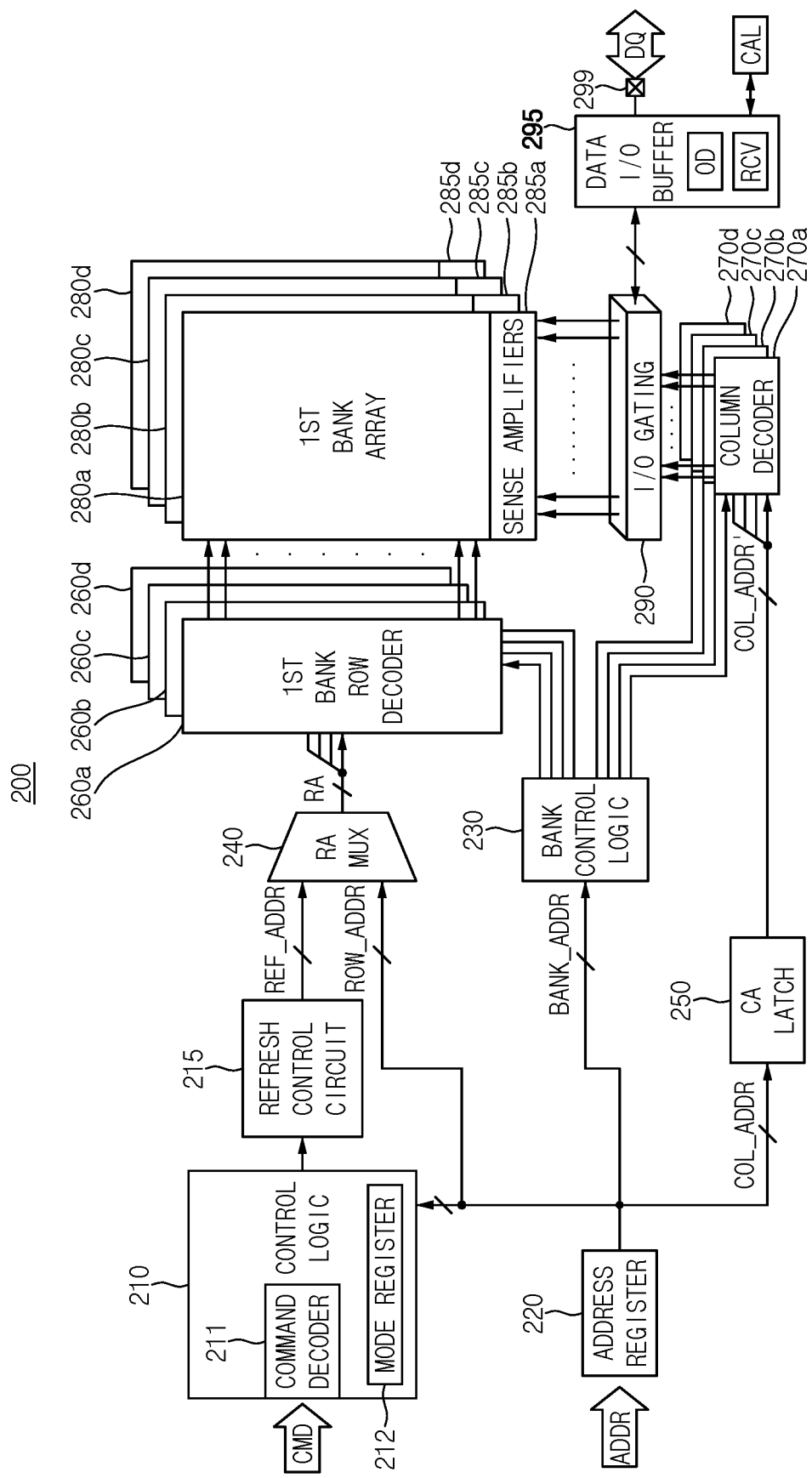
FIG. 22 is a block diagram illustrating an example of a memory device included in a memory system according to example embodiments.

FIG. 22 is a block diagram illustrating an example of a memory device included in a memory system according to example embodiments.

Referring to FIG. 22, a memory device 200 includes a control logic 210, a refresh control circuit 215, an address register 220, a bank control logic 230, a row address multiplexer 240, a column address latch 250, a row decoder, a column decoder, a memory cell array, a sense amplifier unit, an input/output (I/O) gating circuit 290, a data I/O buffer 295 and a data I/O pad 299. In some example embodiments, the memory device 200 may be, e.g., a volatile memory device. For example, the memory device 200 may be one of various volatile memory devices such as a dynamic random access memory (DRAM).

The memory cell array may include a plurality of memory cells. The memory cell array may include a plurality of bank arrays, e.g., first through fourth bank arrays 280a, 280b, 280c and 280d. The row decoder may include a plurality of bank row decoders, e.g., first through fourth bank row decoders 260a, 260b, 260c and 260d connected to the first through fourth bank arrays 280a, 280b, 280c and 280d, respectively. The column decoder may include a plurality of bank column decoders, e.g., first through fourth bank column decoders 270a, 270b, 270c and 270d connected to the first through fourth bank arrays 280a, 280b, 280c and 280d, respectively. The sense amplifier unit may include a plurality of bank sense amplifiers, e.g., first through fourth bank sense amplifiers 285a, 285b, 285c and 285d connected to the first through fourth bank arrays 280a, 280b, 280c and 280d, respectively.

The first through fourth bank arrays 280a to 280d, the first through fourth bank row decoders 260a to 260d, the first through fourth bank column decoders 270a to 270d, and the first through fourth bank sense amplifiers 285a to 285d may form first through fourth banks, respectively. For example, the first bank array 280a, the first bank row decoder 260a, the first bank column decoder 270a, and the first bank sense amplifier 285a may form the first bank; the second bank array 280b, the second bank row decoder 260b, the second bank column decoder 270b, and the second bank sense amplifier 285b may form the second bank; the third bank array 280c, the third bank row decoder 260c, the third bank column decoder 270c, and the third bank sense amplifier 285c may form the third bank; and the fourth bank array 280d, the fourth bank row decoder 260d, the fourth bank column decoder 270d, and the fourth bank sense amplifier 285d may form the fourth bank.

The address register 220 may receive an address ADDR including a bank address BANK_ADDR, a row address ROW_ADDR and a column address COL_ADDR from a memory controller (e.g., the memory controller 20 in FIG. 20). The address register 220 may provide the received bank address BANK_ADDR to the bank control logic 230, may provide the received row address ROW_ADDR to the row address multiplexer 240, and may provide the received column address COL_ADDR to the column address latch 250.

The bank control logic 230 may generate bank control signals in response to receipt of the bank address BANK_ADDR. One of the first through fourth bank row decoders 260a to 260d corresponding to the received bank address BANK_ADDR may be activated in response to the bank control signals generated by the bank control logic 230, and one of the first through fourth bank column decoders 270a to 270d corresponding to the received bank address BANK_ADDR may be activated in response to the bank control signals generated by the bank control logic 230.

The refresh control circuit 215 may generate a refresh address REF_ADDR in response to receipt of a refresh command or entrance of any self-refresh mode. For example, the refresh control circuit 215 may include a refresh counter that is configured to sequentially change the refresh address REF_ADDR from a first address of the memory cell array to a last address of the memory cell array. The refresh control circuit 215 may receive control signals from the control logic 210.

The row address multiplexer 240 may receive the row address ROW_ADDR from the address register 220, and may receive the refresh address REF_ADDR from the refresh control circuit 215. The row address multiplexer 240 may selectively output the row address ROW_ADDR or the refresh address REF_ADDR. A row address RA output from the row address multiplexer 240 (e.g., the row address ROW_ADDR or the refresh address REF_ADDR) may be applied to the first through fourth bank row decoders 260a to 260d.

The activated one of the first through fourth bank row decoders 260a to 260d may decode the row address output from the row address multiplexer 240, and may activate a wordline corresponding to the row address. For example, the activated bank row decoder may apply a wordline driving voltage to the wordline corresponding to the row address.

The column address latch 250 may receive the column address COL_ADDR from the address register 220, and may temporarily store the received column address COL_ADDR. The column address latch 250 may apply the temporarily stored or received column address COL_ADDR' to the first through fourth bank column decoders 270a to 270d.

The activated one of the first through fourth bank column decoders 270a to 270d may decode the column address COL_ADDR output from the column address latch 250, and may control the I/O gating circuit 290 to output data corresponding to the column address COL_ADDR.

The I/O gating circuit 290 may include a circuitry for gating I/O data. For example, although not illustrated, the I/O gating circuit 290 may include an input data mask logic, read data latches for storing data output from the first through fourth bank arrays 280a to 280d, and write drivers for writing data to the first through fourth bank arrays 280a to 280d.

Data DQ to be read from one of the first through fourth bank arrays 280a to 280d may be sensed by a sense amplifier coupled to the one bank array, and may be stored in the read data latches. The data DQ stored in the read data latches may be provided to the memory controller via the data I/O buffer 295 and the data I/O pad 299. Data DQ received via the data I/O pad 299 that are to be written to one of the first through fourth bank arrays 280a to 280d may be provided from the memory controller to the data I/O buffer 295. The data DQ received via the data I/O pad 299 and provided to the data I/O buffer 295 may be written to the one bank array via the write drivers in the I/O gating circuit 290. For example, the data I/O buffer 295 may include an output driver OD and a receiver RCV, and may compensate at least one of the timing skew and the offset using a calibrator CAL according to example embodiments. In example embodiments, the output driver OD, the receiver RCV, and the calibrator CAL of the memory device 200 may correspond to the output driver, the multi-level receiver, and calibrator of FIGS. 1, 2A, 2B, 3A, 3B, 5, 10A, 10B, 15, 16, 17A, 17B, and 19.

The control logic 210 may control an operation of the memory device 200. For example, the control logic 210 may generate control signals for the memory device 200 to perform a data write operation or a data read operation. The control logic 210 may include a command decoder 211 that decodes a command CMD received from the memory controller and a mode register 212 that sets an operation mode of the memory device 200.

Although the memory device included in the memory system according to example embodiments is described based on a DRAM, the memory device according to example embodiments may be any volatile memory device, and/or any nonvolatile memory device, e.g., a static random access memory (SRAM), a flash memory, a phase-change random access memory (PRAM), a resistive random access memory (RRAM), a nano floating gate memory (NFGM), a polymer random access memory (PoRAM), a magnetic random access memory (MRAM), a ferroelectric random access memory (FRAM), a thyristor random access memory (TRAM), or the like.

Figure 23:
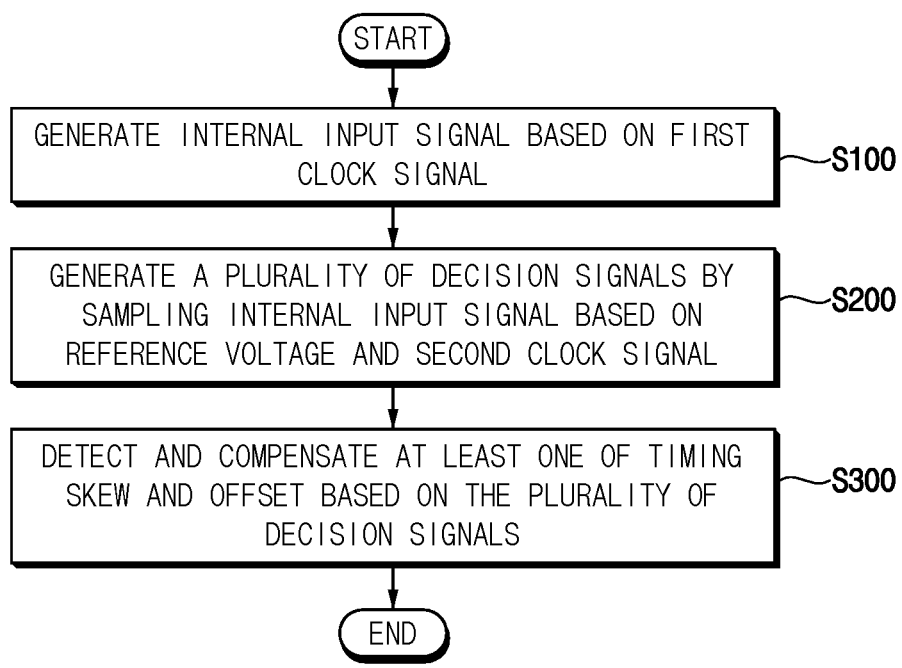
FIG. 23 is a flowchart illustrating a method of operating a memory device according to example embodiments.

FIG. 23 is a flowchart illustrating a method of operating a memory device according to example embodiments.

Referring to FIG. 23, in a method of operating a memory device according to example embodiments, an internal input signal is generated based on a first clock signal (operation S100), a plurality of decision signals are generated by sampling the internal input signal based on a reference voltage and a second clock signal (operation S200), and at least one of timing skew and offset associated with a plurality of samplers is detected and compensated based on the plurality of decision signals (operation S300). For example, the memory device may be the memory device operating based on the multi-level signal as described with reference to FIGS. 1, 2A, 2B, 3A, 3B, 4A, 4B, 5, 6, 7A-7D, 8, 9A, 9B, 10A, 10B, 11, 12, 13A, 13B, and 14, or may be the memory device operating based on the NRZ signal as described with reference to FIGS. 15, 16, 17A, 17B, 18, and 19.

The example embodiments may be applied to various electronic devices and systems that include the memory devices. For example, the example embodiments may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A memory device comprising:
   a data input/output (I/O) pin;
   an output driver connected to the data I/O pin, and configured to generate an internal input signal based on a first clock signal; and
   a multi-level receiver connected to the data I/O pin, the multi-level receiver comprising:
   a plurality of samplers configured to generate a plurality of decision signals by sampling the internal input signal based on a reference voltage and a second clock signal; and
   a calibrator configured to detect and compensate at least one of timing skew and offset associated with the plurality of samplers based on the plurality of decision signals,
   wherein the internal input signal is a multi-level signal having three or more voltage levels that are different from each other.

2. The memory device of claim 1, wherein, in a calibration mode of the memory device, the memory device is configured such that the calibrator detects and compensates the at least one of the timing skew and the offset associated with the plurality of samplers without an external input signal received from an external device through the data I/O pin.

3. The memory device of claim 2, wherein, in the calibration mode, the data I/O pin has a high impedance (Hi-Z) state.

4. The memory device of claim 2, wherein, in a normal operation mode of the memory device subsequent to the calibration mode, the memory device is configured such that the plurality of samplers sample a multi-level input signal received through the data I/O pin based on a plurality of reference voltages that are different from each other.

5. The memory device of claim 1, wherein the calibrator includes:
a timing skew detection circuit configured to detect the timing skew associated with the plurality of samplers based on the plurality of decision signals; and
a plurality of delay control cells configured to generate a plurality of third clock signals based on the second clock signal, and compensate the timing skew associated with the plurality of samplers by adjusting a phase of the second clock signal.

6. The memory device of claim 1, wherein the calibrator includes:
an offset detection circuit configured to detect the offset associated with the plurality of samplers based on the plurality of decision signals; and
a plurality of offset control cells configured to compensate the offset associated with the plurality of samplers.

7. The memory device of claim 1, wherein the multi-level signal includes a first voltage level, a second voltage level, a third voltage level and a fourth voltage level that are different from each other.

8. The memory device of claim 7, wherein the multi-level receiver includes:
a first sampler configured to generate a first decision signal by sampling the internal input signal based on the reference voltage and a first sub-clock signal generated from the second clock signal;
a second sampler configured to generate a second decision signal by sampling the internal input signal based on the reference voltage and a second sub-clock signal generated from the second clock signal; and
a third sampler configured to generate a third decision signal by sampling the internal input signal based on the reference voltage and a third sub-clock signal generated from the second clock signal.

9. The memory device of claim 8, wherein the calibrator includes:
a first delay control cell configured to generate the first sub-clock signal by adjusting a phase of the second clock signal based on a first delay control signal, and provide the first sub-clock signal to the first sampler;
a second delay control cell configured to generate the second sub-clock signal by adjusting the phase of the second clock signal based on a second delay control signal, and provide the second sub-clock signal to the second sampler;
a third delay control cell configured to generate the third sub-clock signal by adjusting the phase of the second clock signal based on a third delay control signal, and provide the third sub-clock signal to the third sampler; and
a control circuit configured to generate the first delay control signal, the second delay control signal and the third delay control signal based on the first decision signal, the second decision signal and the third decision signal, respectively.

10. The memory device of claim 9, wherein, in response to a logic level of the first decision signal being different from logic levels of the second and third decision signals, the memory device is configured such that:
either the first delay control cell provides the first sub-clock signal by adjusting the phase of the second clock signal based on the first delay control signal to the first sampler, or
the second and third delay control cells provide the second and third sub-clock signals by adjusting the phase of the second clock signal based on the second and third delay control signals to the second and third samplers, respectively.

11. The memory device of claim 8, wherein, in a normal operation mode of the memory device, the memory device is configured such that the first sampler, the second sampler and the third sampler sample a multi-level input signal received through the data I/O pin based on a first reference voltage, a second reference voltage and a third reference voltage, respectively, that are different from each other.

12. The memory device of claim 8, wherein phases of the first to fourth sub-clock signals are partially overlapped with each other.

13. The memory device of claim 12, wherein the multi-level receiver includes:
a first sampler configured to generate a first decision signal by sampling the internal input signal based on the reference voltage and the first sub-clock signal;
a second sampler configured to generate a second decision signal by sampling the internal input signal based on the reference voltage and the second sub-clock signal;
a third sampler configured to generate a third decision signal by sampling the internal input signal based on the reference voltage and the third sub-clock signal; and
a fourth sampler configured to generate a fourth decision signal by sampling the internal input signal based on the reference voltage and the fourth sub-clock signal.

14. The memory device of claim 13, wherein the calibrator includes:
a first offset control cell included in the first sampler, and configured to adjust an output level of the first sampler based on a first offset control signal;
a second offset control cell included in the second sampler, and configured to adjust an output level of the second sampler based on a second offset control signal;
a third offset control cell included in the third sampler, and configured to adjust an output level of the third sampler based on a third offset control signal;
a fourth offset control cell included in the fourth sampler, and configured to adjust an output level of the fourth sampler based on a fourth offset control signal; and
a control circuit configured to generate the first offset control signal, the second offset control signal, the third offset control signal and the fourth offset control signal based on the first decision signal, the second decision signal, the third decision signal and the fourth decision signal, respectively.

15. The memory device of claim 14, wherein, in response to a logic level of the first decision signal being different from logic levels of the second, third and fourth decision signals, the memory device is configured such that:
either the first offset control cell adjusts the output level of the first sampler based on the first offset control signal, or
the second, third and fourth offset control cells adjust the output levels of the second, third and fourth samplers based on the second, third and fourth offset control signals, respectively.

16. The memory device of claim 13, wherein, in a normal operation mode of the memory device, memory device is configured such that the first sampler, the second sampler, the third sampler and the fourth sampler sample a multi-level input signal received through the data I/O pin based on a first reference voltage.

17. The memory device of claim 1, wherein the plurality of samplers are configured to sample the internal input signal based on the internal input signal having a fixed level and the reference voltage having a variable level.

18. A memory device comprising:
a data input/output (I/O) pin;
an output driver connected to the data I/O pin, and configured to generate an internal input signal based on a first clock signal; and
a receiver connected to the data I/O pin, the receiver comprising:
a plurality of samplers configured to generate a plurality of decision signals by sampling the internal input signal based on a reference voltage and a plurality of second clock signals whose phases partially overlap; and
a calibrator configured to detect and compensate an offset associated with the plurality of samplers based on the plurality of decision signals,
wherein the internal input signal is a non-return-to-zero (NRZ) signal having two voltage levels that are different from each other.

19. The memory device of claim 18, wherein the memory device is configured such that:
in a calibration mode of the memory device, the calibrator detects and compensates the offset associated with the plurality of samplers without an external input signal received from an external device through the data I/O pin, and
in a normal operation mode of the memory device subsequent to the calibration mode, the output driver generates an NRZ output signal output through the data I/O pin, and the plurality of samplers sample an NRZ input signal received through the data I/O pin based on the reference voltage.

20. A memory device comprising:
a data input/output (I/O) pin;
an output driver connected to the data I/O pin, and configured to generate an internal input signal based on a first clock signal;
a multi-level receiver connected to the data I/O pin, the multi-level receiver comprising:
a plurality of samplers configured to generate a plurality of decision signals by sampling the internal input signal based on a reference voltage and a second clock signal; and
a calibrator configured to detect and compensate at least one of timing skew and offset associated with the plurality of samplers based on the plurality of decision signals,
wherein the plurality of samplers include:
a first sampler configured to generate a first decision signal by sampling the internal input signal based on the reference voltage and a first sub-clock signal;
a second sampler configured to generate a second decision signal by sampling the internal input signal based on the reference voltage and a second sub-clock signal;
a third sampler configured to generate a third decision signal by sampling the internal input signal based on the reference voltage and a third sub-clock signal;
a fourth sampler configured to generate a fourth decision signal by sampling the internal input signal based on the reference voltage and a fourth sub-clock signal;
a fifth sampler configured to generate a fifth decision signal by sampling the internal input signal based on the reference voltage and a fifth sub-clock signal; and
a sixth sampler configured to generate a sixth decision signal by sampling the internal input signal based on the reference voltage and a sixth sub-clock signal,
wherein the first to sixth sub-clock signals are generated based on the second clock signal,
wherein phases of the first to fourth sub-clock signals are partially overlapped with each other, and phases of the first, fifth, and sixth sub-clock signals are the same as each other, and
wherein the calibrator includes:
a first offset control cell configured to determine that an offset associated with the first sampler has occurred and adjust an output level of the first sampler, in response to a logic level of the first decision signal being different from a logic level of each of the second, third and fourth decision signals; and
a first delay control cell configured to determine that a timing skew associated with the first sampler has occurred and adjust a phase of the first sub-clock signal, in response to a logic level of the first decision signal being different from a logic level of each of the fifth and sixth decision signals.

\* \* \* \* \*